United States Patent
Takahashi et al.

(10) Patent No.: US 8,066,393 B2
(45) Date of Patent: Nov. 29, 2011

(54) LIQUID CRYSTAL DISPLAY DEVICE

(75) Inventors: Yoshiaki Takahashi, Chiba (JP);
Masayuki Mifune, Mobara (JP);
Hiroshi Nakamoto, Chiba (JP);
Michihide Shibata, Mutsuzawa (JP);
Akiyoshi Tobe, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 503 days.

(21) Appl. No.: 12/198,141

(22) Filed: Aug. 26, 2008

(65) Prior Publication Data

US 2009/0059621 A1 Mar. 5, 2009

(30) Foreign Application Priority Data

Aug. 27, 2007 (JP) ................................. 2007-219186

(51) Int. Cl.
*F21V 8/00* (2006.01)
(52) U.S. Cl. ....... 362/97.1; 362/606; 362/607; 362/612; 362/613; 362/617; 362/623
(58) Field of Classification Search ................. 362/97.1, 362/606, 607, 612, 613, 617, 623; 349/65, 349/95; 385/119, 901
See application file for complete search history.

(56) References Cited

U.S. PATENT DOCUMENTS

| 5,349,503 | A  | * | 9/1994 | Blonder et al. | 362/623 |
| 6,606,133 | B1 | * | 8/2003 | Okabe | 349/65 |
| 7,004,611 | B2 | * | 2/2006 | Parker et al. | 362/606 |
| 7,566,156 | B2 | * | 7/2009 | Hasei et al. | 362/558 |

FOREIGN PATENT DOCUMENTS

JP 2001-296407 10/2001
JP 2007-121675 5/2007

* cited by examiner

*Primary Examiner* — Sharon Payne
(74) *Attorney, Agent, or Firm* — Antonelli, Terry, Stout & Kraus, LLP.

(57) ABSTRACT

In a backlight which arranges light emitting diodes on a side surface of a light guide plate, irregularities of radiation light from the backlight can be decreased. In a liquid crystal display device having a backlight which radiates light to a liquid crystal panel, LEDs which constitute a light emitting element are mounted on a light guide plate formed on the backlight, and teardrop-shaped lenses are formed on a light radiation surface of the light guide plate. By changing the advancing directions of lights radiated from the light emitting element using the teardrop-shaped lenses, it is possible to decrease irregularities of a planar light source by scattering the radiation lights from the light guide plate.

9 Claims, 20 Drawing Sheets

LIQUID CRYSTAL DISPLAY DEVICE

BACKGROUND OF THE INVENTION

1. Field of the Invention

The present invention relates to a light source of a non-self-luminous display device, and more particularly to a liquid crystal display device having a backlight which includes a light guide plate and uses an LED as a light source.

2. Background Art

Recently, the liquid crystal display device has been popularly used as a display device. Particularly, the liquid crystal display device is used as a display part of portable equipment because the liquid crystal display device is thin and light-weighted, and consumes small electric power.

However, the liquid crystal display device is not self-luminous and hence, the liquid crystal display device requires a lighting means. In general, as a lighting device which is used for the liquid crystal display device, a planar lighting device referred to as a backlight is popularly used. Conventionally, although a cold cathode fluorescent tube has been used as a light emitting element (also referred to as a light source) of the backlight, an LED (light emitting diode) has been also recently used as the light emitting element.

The backlight includes a plate-shaped light guide plate. A material of the light guide plate is a light transmitting resin or the like, and light incident on the light guide plate from the light emitting element propagates in the inside of the light guide plate. A reflection/scattering member such as grooves, projections or a printed material is formed on the light guide plate, and the light which propagates in the inside of the light guide plate due to such a reflection/scattering member is directed and radiated toward a liquid-crystal-display-device side.

When the LEDs are used as the light emitting element, the LED is a spot light source and hence, there arises a drawback that the uniform radiation of light from the light guide plate is difficult. Accordingly, for example, JP-A-2007-121675 or the like proposes a technique which uniformly diffuses light of LEDs which constitute a spot light source, wherein the constitution which forms conical lenses on an optical sheet is disclosed. However, in the technique described in patent document 1, the lenses are formed on the optical sheet but are not directly formed on the light guide plate. Further, JP-A-2001-296407 discloses a meandering lens. However, the lens is formed on an optical sheet but is not directly formed on the light guide plate.

SUMMARY OF THE INVENTION

In a backlight which uses an LED as a light emitting element and uses a plurality of LEDs for realizing the high brightness, the LEDs are arranged on a side surface of a light guide plate in a scattered manner. Accordingly, there arises a portion where the light is not incident between the LED and the LED thus making the uniform radiation of light incident in the inside of the light guide plate from the LEDs difficult.

It is an object of the present invention to provide a liquid crystal display device including a display panel, a backlight which radiates light to the display panel, a light emitting element mounted on the backlight, and a light guide plate on which light from the light emitting element is incident, wherein the light emitting element is mounted on a side surface of the light guide plate.

Teardrop-shaped lenses are formed on the light radiation surface of the light guide plate thus diffusing light to be radiated, and light radiated from the backlight is made uniform in plane.

By forming the lenses on the light radiation surface of the light guide plate, it is possible to acquire the uniform light intensity in plane by controlling the direction of light radiated from the light guide plate thus decreasing irregularities of light radiated from the light guide plate.

DETAIL DESCRIPTION OF THE EMBODIMENTS

In a liquid crystal display device including a liquid crystal panel and a planar lighting device which radiates light to the liquid crystal panel, the planar lighting device includes a light guide plate having a light radiation surface and a bottom surface which faces the light radiation surface in an opposed manner. Further, the light guide plate includes side surfaces which intersect with the light radiation surface and the bottom surface. A plurality of LEDs is arranged along the first side surface of the light guide plate. The first side surface forms a light incident surface of the light guide plate by allowing light from the LEDs to be incident on the light guide plate from the first side surface. The light incident on the light guide plate is directed toward a light-radiation-surface side by a scattering member mounted on the bottom surface of the light guide plate, and is radiated from the light radiation source. Teardrop-shaped lenses are formed on the light radiation surface of the light guide plate for diffusing the light by the teardrop-shaped lenses thus decreasing irregularities of light radiated from the light guide plate.

Figure 1:
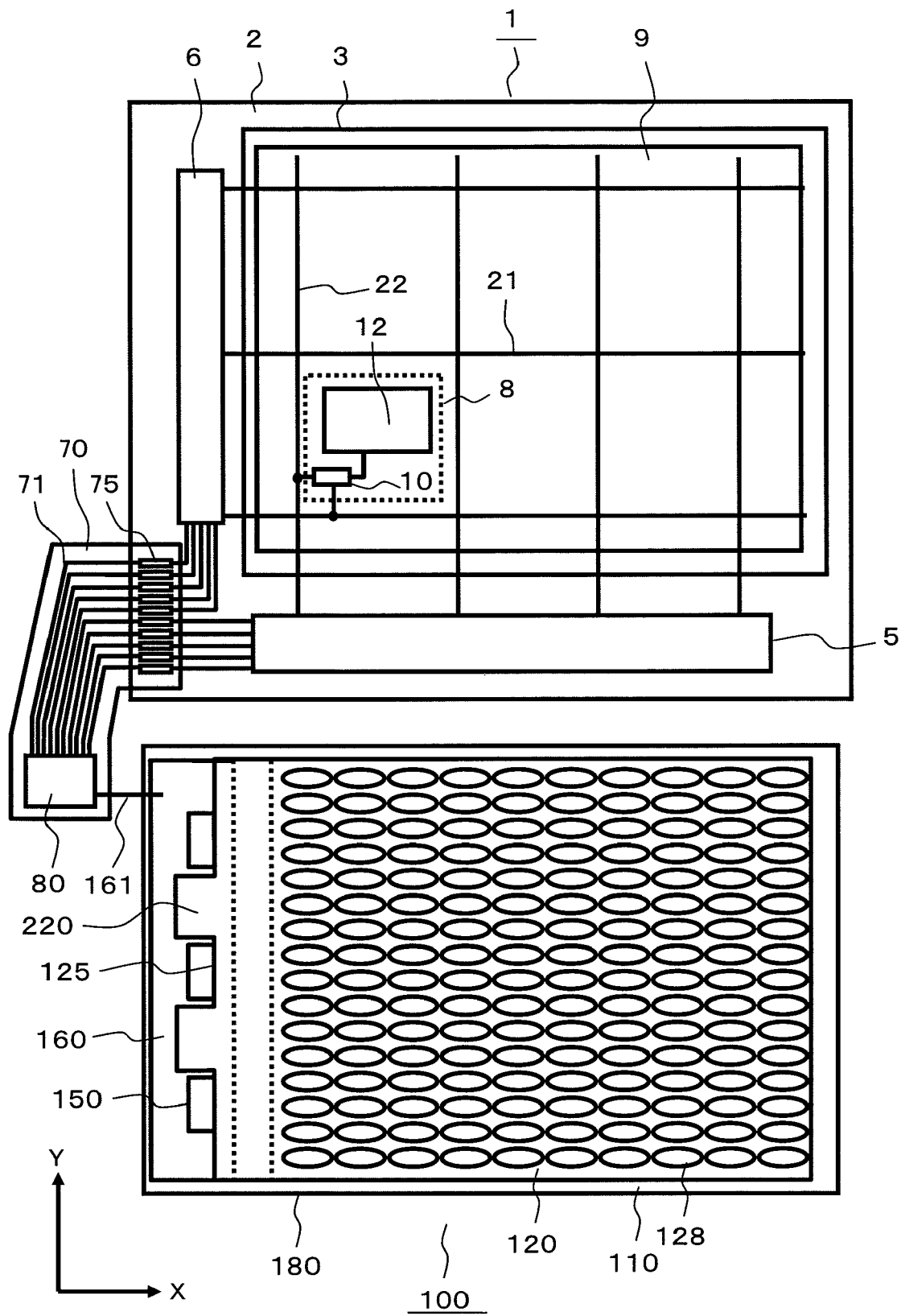
FIG. 1 is a block diagram showing the schematic constitution of a liquid crystal display device of an embodiment according to the present invention.

FIG. 1 is a plan view showing a liquid crystal display device 100 according to the present invention. The liquid crystal display device 100 is constituted of a liquid crystal panel 1, a backlight 110 and a control circuit 80. Signals and power source voltages necessary for a display of the liquid crystal display device 100 are supplied from the control circuit 80. The control circuit 80 is mounted on a flexible printed circuit board 70, and signals are transmitted to the liquid crystal panel 1 via lines 71 and terminals 75.

The backlight 110 is constituted of a light guide plate 120, LEDs 150 and a housing casing 180. The backlight 110 is provided for radiating light to the liquid crystal panel 1. The liquid crystal panel 1 performs a display by controlling a transmission quantity or a reflection quantity of light radiated from the backlight 110. Here, the backlight 110 is mounted on a back-surface side or a front-surface side of the liquid crystal panel 1 in a stacked manner as viewed from a viewer. However, in FIG. 1, to facilitate the understanding of the constitution of the liquid crystal display device, the backlight 110 is shown in a state that the backlight 110 is arranged parallel to the liquid crystal panel 1.

The light guide plate 120 has a substantially rectangular shape, and the LEDs 150 are arranged on the side surface thereof. Numeral 160 indicates a flexible printed circuit board which electrically connects the plurality of LEDs 150 with each other. The flexible printed circuit board 160 and the control circuit 80 are electrically connected with each other by lines 161.

A side surface 125 on which the LEDs 150 are arranged is referred to as a light incident surface or a light entering surface, and the light is incident on the light guide plate 120 from the light incident surface 125. Teardrop-shaped lenses 128 are formed on the light radiation surface of the light guide plate 120 and diffuse the light to be radiated thus decreasing irregularities of light. The teardrop-shaped lenses 128 are explained in detail later.

Next, the liquid crystal panel 1 is explained. The liquid crystal panel 1 includes two substrates consisting of a TFT substrate 2 and a color filter substrate 3 which overlap with each other, and the liquid crystal composition sandwiched between these two substrates. A pixel electrode 12 is provided to each pixel portion 8 of the TFT substrate 2. Although the liquid crystal panel 1 includes a large number of pixel portions 8 arranged in a matrix array, to prevent the drawing from becoming complicated, only one pixel portion 8 is shown in FIG. 1. The pixel portions 8 arranged in a matrix array form a display region 9, each pixel portion 8 plays a role of a pixel of a displayed image, and an image is displayed in the display region 9.

In FIG. 1, gate signal lines (also referred to as scanning lines) 21 which extend in the x direction and are arranged parallel to each other in the y direction in the drawing, and drain signal lines (also referred to as video signal lines) 22 which extend in the y direction and are arranged parallel to each other in the x direction in the drawing are provided, wherein the gate signal lines 21 and the drain signal lines 22 intersect with each other. Further, each pixel portion 8 is formed in a region surrounded by the gate signal lines 21 and the drain signal lines 22.

A switching element 10 is provided to the pixel portion 8. A control signal is supplied to the switching element 10 via the gate signal line 21 so as to control an ON/OFF state of the switching element 10. When the switching element 10 is turned on, a video signal transmitted via the drain signal line 22 is supplied to the pixel electrode 12.

The drain signal lines 22 are connected to a drive circuit 5, and the video signals are outputted to the drain signal lines 22 from the drive circuit 5. The gate signal lines 21 are connected to a drive circuit 6, and the control signals are outputted to the gate signal lines 21 from the drive circuit 6. Here, the gate signal lines 21, the drain signal lines 22, the drive circuit 5 and the drive circuit 6 are formed on the same TFT substrate 2. Further, in addition to the drive circuit 5 and the drive circuit 6, the control circuit 80 can be formed on one semiconductor chip.

Figure 2A:
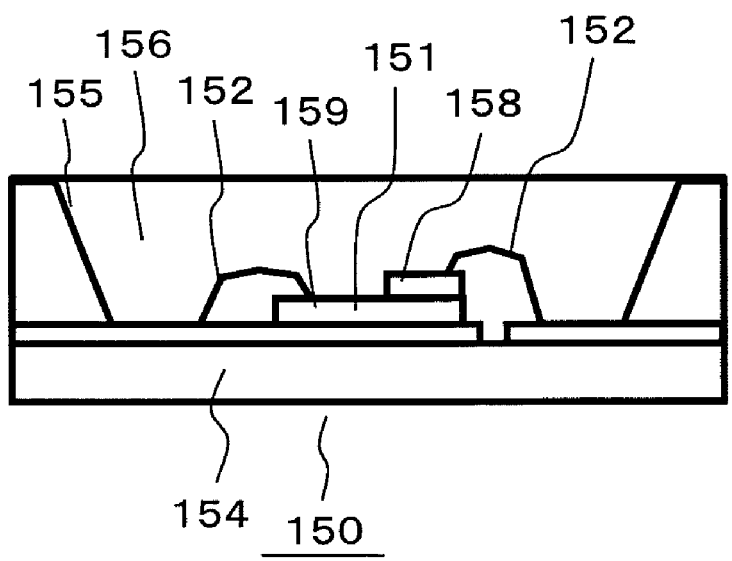
FIG. 2A and FIG. 2B are schematic views showing a light emitting diode of the liquid crystal display device of the embodiment according to the present invention.
Figure 2B:
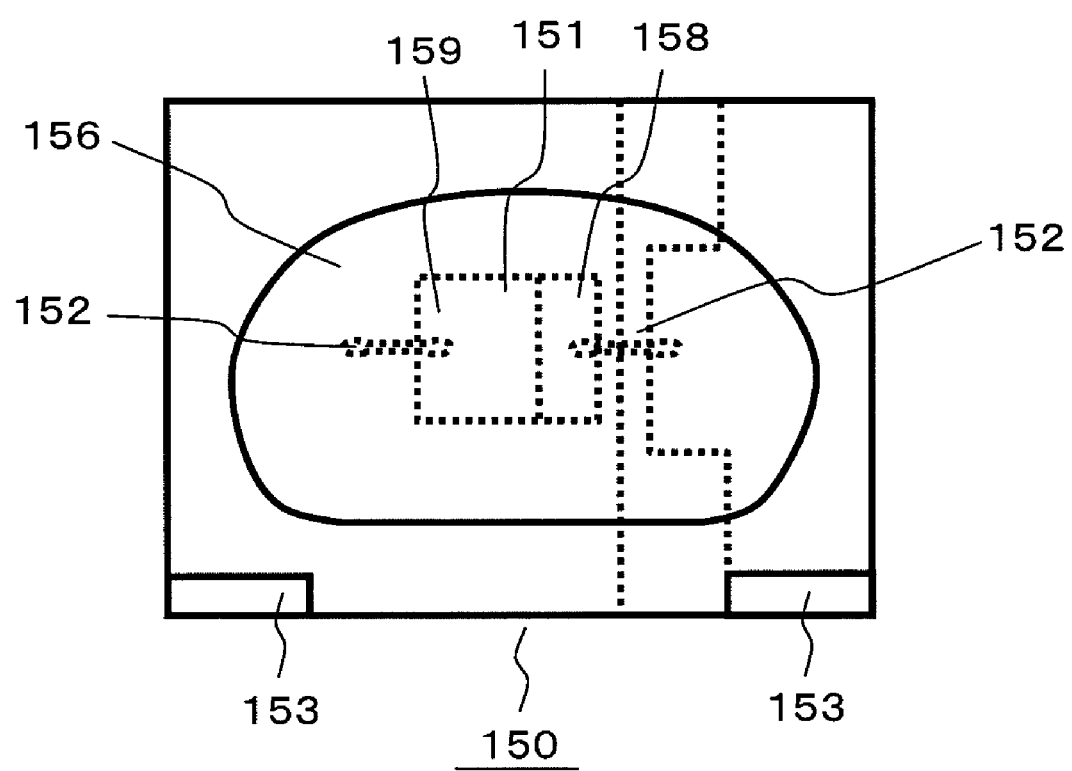

Next, FIG. 2A and FIG. 2B are schematic views showing the LED 150 which constitutes a light emitting element, wherein FIG. 2A is a schematic cross-sectional view of the LED 150, and FIG. 2B is a front view of the LED 150 as viewed from a light-emission side.

The LED 150 is configured such that an LED chip 151 which constitutes a light emission portion is mounted on a chip substrate 154. The LED chip 151 has a pn junction and, when a voltage is applied to the pn junction, the LED chip 151 emits light at a specified wavelength. A p electrode (anode) 158 is formed on a p-type semiconductor layer which forms the pn junction, and an n electrode (cathode) 159 is formed on an n-type semiconductor layer which forms the pn junction.

Wires 152 are respectively connected to the p electrode 158 and the n electrode 159. Chip terminals 153 are provided for connecting the LED 150 to an external portion, and the chip terminals 153 are electrically connected with the p electrode 158 and the n electrode 159 using the wires 152.

A fluorescent light emission part 156 may be arranged on a light-radiation-surface side of the LED chip 151. The fluorescent light emission part 156 has a function of converting a wavelength of light emitted from the LED chip 151. Numeral 155 indicates a reflection portion, and the reflection portion 155 reflects light toward a front side.

Figure 3A:
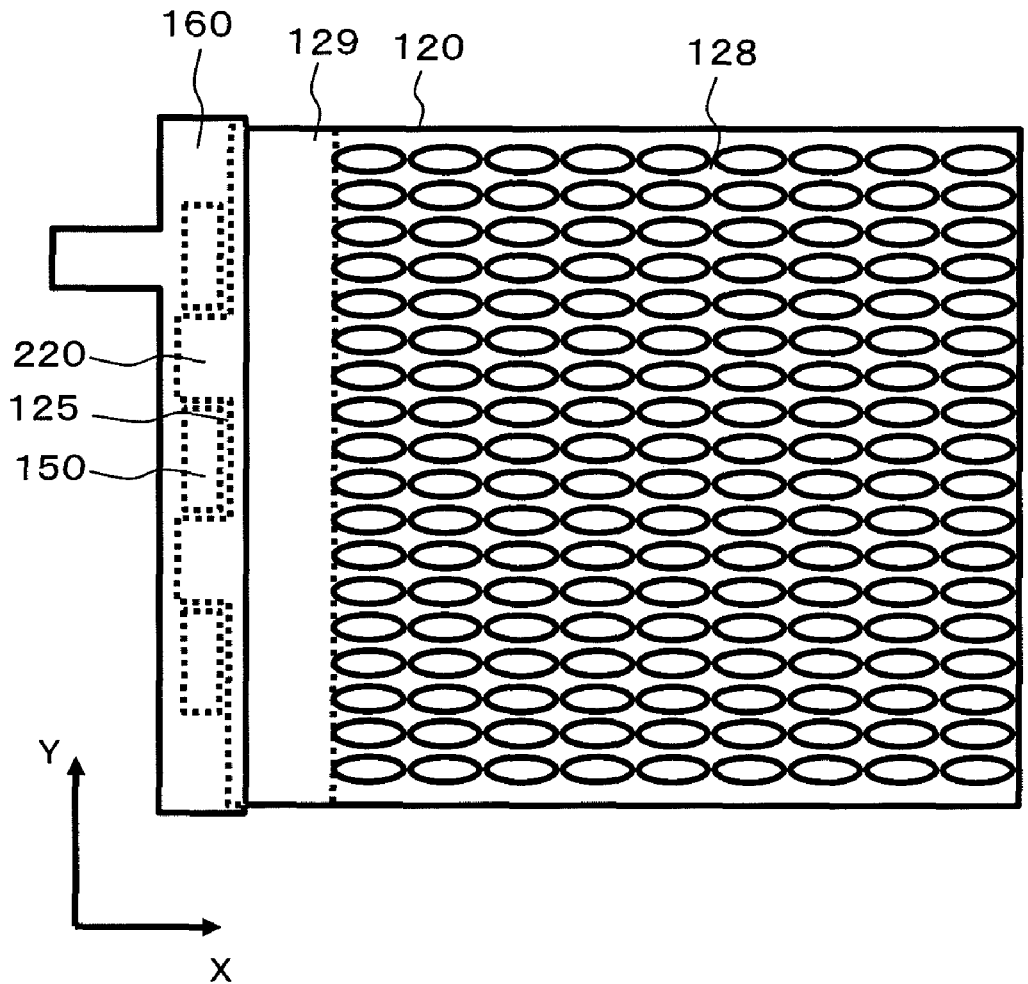
FIG. 3A and FIG. 3B are schematic views showing a light guide plate of the liquid crystal display device of the embodiment according to the present invention.
Figure 3B:
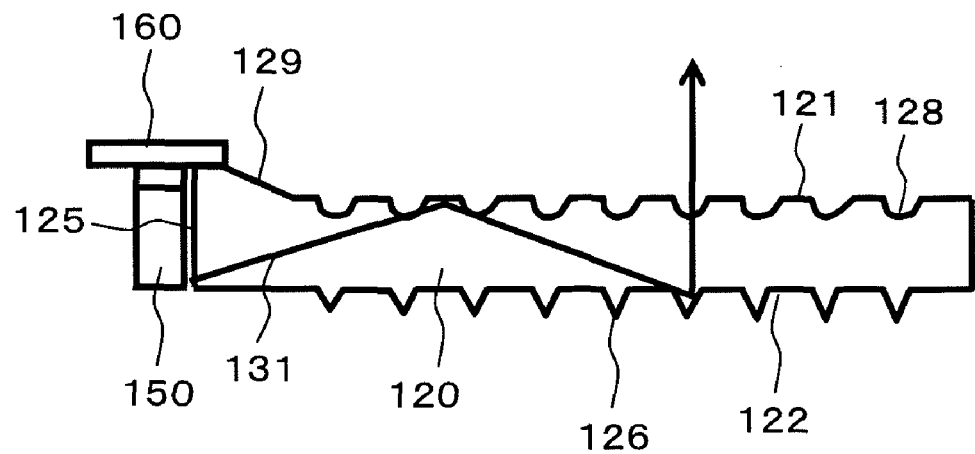

Next, FIG. 3A is a schematic plan view of the light guide plate 120, and FIG. 3B is a schematic side view of the light guide plate 120. As shown in FIG. 3A, the light guide plate 120 is formed into an approximately rectangular shape and, as shown in FIG. 3B, the light guide plate 120 includes an upper surface (also referred to as a light radiation surface) 121 and a lower surface 122. The light guide plate 120 is made of a material such as an acrylic resin or a polycarbonate which allows light to pass therethrough. The light guide plate 120 is formed into a plate shape, and a thickness of the light guide plate 120 is set to 0.2 mm to 1.0 mm.

In FIG. 3B, although a cross section of the light guide plate 120 has an approximately rectangular shape, the inclined surface 129 is formed toward the light radiation surface 121 from the light incident surface 125. The inclined surface 129 is effective when a thickness of the LED 150 is larger than a thickness of the light radiation surface 121, and the inclined surface 129 guides the light incident from the light incident surface 125 which has a thickness larger than a thickness of the light radiation surface 121 toward the light radiation surface 121.

In FIG. 3A and FIG. 3B, the positional relationship between the light guide plate 120, the LED 150 and the flexible printed circuit board 160 is shown. On at least one side of the light guide plate 120, the light incident surface 125 is arranged and, in the vicinity of the light incident surface 125, a plurality of LEDs 150 is arranged. The LEDs 150 are arranged below the flexible printed circuit board 160 and along the light incident surface 125.

An adhesive sheet 190 (not shown in the drawing) is arranged on a light-guide-plate-120 side of the flexible printed circuit board 160. By adhering and fixing the flexible printed circuit board 160 to the light guide plate 120, a position of the LED 150 is adjusted with respect to the light incident surface 125.

Next, light 131 emitted from the LED 150 is explained in conjunction with FIG. 3B. The light 131 emitted from the LED 150 is incident on the light guide plate 120 from the light incident surface 125. A refractive index of the light guide plate 120 is larger than a refractive index of air and hence, light which reaches the light incident surface 125 at an angle larger than a specified angle with respect to the direction perpendicular to the light incident surface 125 is reflected on the light incident surface 125, while light which reaches the light incident surface 125 at an angle smaller than the specified angle with respect to the direction perpendicular to the light incident surface 125 enters the inside of the light guide plate 120.

The upper surface 121 and the lower surface 122 of the light guide plate 120 are arranged to be substantially orthogonal to the light incident surface 125, and the light which enters the inside of the light guide plate 120 advances in the inside of the light guide plate 120 while repeating the total reflection between the upper surface 121 and the lower surface 122 of the light guide plate 120. Grooves 126 having a V-shaped cross section are formed in the lower surface 122 as reflection portions. A part of the light which advances through the light guide plate 120 is reflected toward the upper-surface-121 side on the grooves 126 formed in the lower surface 122, and is radiated from the upper surface 121. Here, the explanation is made with respect to a case in which the reflection portion is formed of the grooves 126 having a V-shaped cross section as one example. However, any reflection portion may be used provided that the reflection portion has a function of directing the light which advances in the inside of the light guide plate toward the upper-surface-121 side. For example, white dots formed by printing or the like may be used as the reflection portions.

Teardrop-shaped lenses 128 are formed on the upper surface 121 of the light guide plate 120. Radiation light is diffused by the teardrop-shaped lenses 128. The teardrop-shaped lenses 128 are formed on the upper surface 121 in a state that the teardrop-shaped lenses 128 diffuse the light in the Y direction in FIG. 3A. In the explanation made hereinafter, the Y direction which is parallel to the incident surface 125 is referred to as the lateral direction of the light guide plate 120, while the X direction which extends in the main advancing direction of light is referred to as the longitudinal direction. A state of light diffused by the teardrop-shaped lenses 128 is explained in detail later.

Figure 4A:
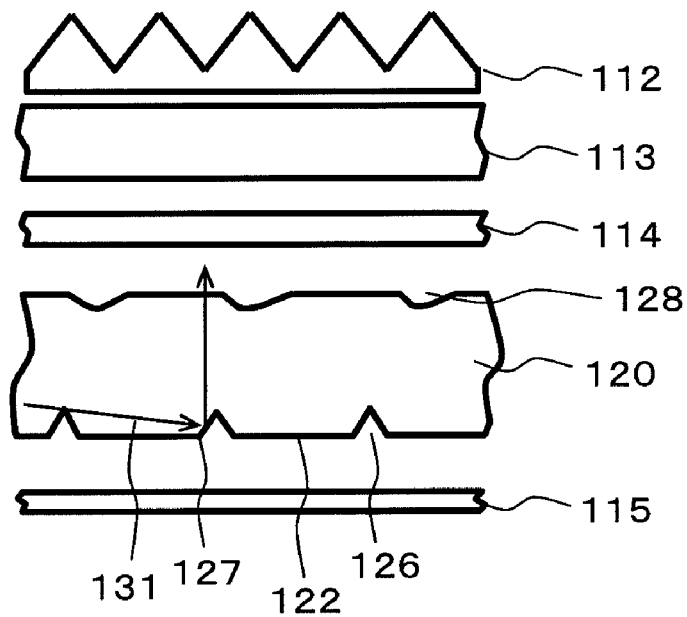
FIG. 4A and FIG. 4B are schematic cross-sectional views showing the light guide plate of the liquid crystal display device of the embodiment according to the present invention.
Figure 4B:
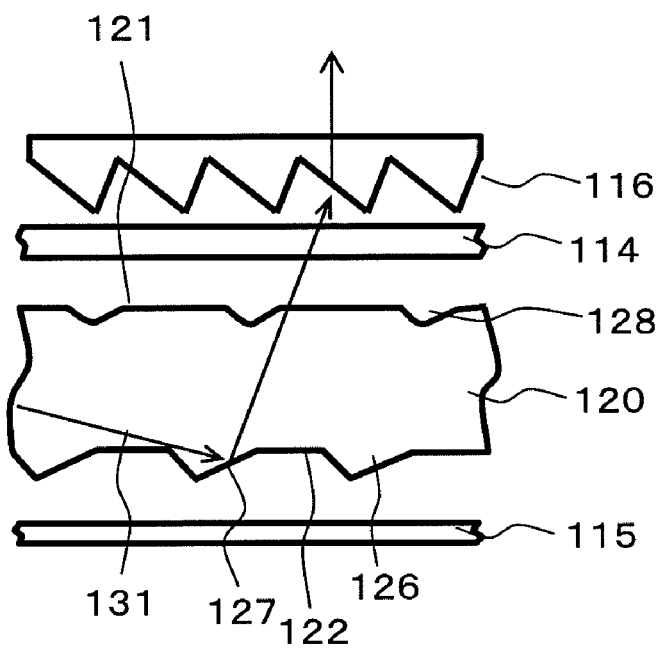

Next, the light which is reflected on the grooves 126 is explained in conjunction with FIG. 4A and FIG. 4B. FIG. 4A shows a case in which the grooves 126 projects inwardly, while FIG. 4B shows a case in which the grooves 126 project outwardly. Each groove 126 includes a reflection surface (also referred to as an inclined surface) 127, wherein the reflection surface 127 makes an angle of 1 to 35 degrees with respect to the lower surface 122. The light which is reflected on the reflection surface 127 is reflected toward the upper surface 121 of the light guide plate 120. By reflecting the light on the reflection surface 127, it is possible to set an angle of light with respect to the upper surface 121 to an angle which allows the light to be radiated from the upper surface 121. That is, although the light repeats the total reflection in the inside of the light guide plate 120 as described above, due to the formation of the reflection surfaces 127, the angle of the light with respect to the upper surface 121 becomes an angle which allows the radiation of light from the light guide plate 120.

The grooves 126 are continuously formed in the direction along the light incident surface 125 (in the lateral direction of the light guide plate 120). Further, the reflection surface 127 of the groove 126 has a planar shape and hence, the advancing direction of light reflected on the reflection surface 127 is not changed in the lateral direction of the light guide plate 120. Accordingly, the teardrop-shaped lenses 128 are formed on the light radiation surface 121 so as to refract the advancing direction of the light through the light guide plate 120 in the lateral direction.

As shown in FIG. 4A, prism sheets 112, 113 are arranged on the upper surface 121 of the light guide plate 120 so as to control the direction of light radiated from the light guide plate 120. Here, in FIG. 4A, the prism sheets 112, 113 are arranged in a state that ridges of triangular columns of the prism sheet 112 and ridges of triangular columns of the prism sheet 113 intersect with each other. Accordingly, the prism sheet 113 can refract the advancing direction of light which is radiated from the light guide plate 120 in the lateral direction thus directing the light toward the inside (liquid-crystal-panel side). Here, numeral 114 indicates a diffusion plate, and numeral 115 indicates a reflection sheet.

Next, FIG. 4B shows a case in which one sheet of asymmetric prism sheet is used. The light which is reflected on the reflection surface 127 makes an obtuse angle with respect to the perpendicular direction of the upper surface 121, and the light is radiated from the upper surface 121 such that the light expands outwardly (toward a right side in the drawing). On the light guide plate 120, an asymmetrical prism sheet 116 is formed so as to refract the outgoing light toward a liquid-crystal-panel (not shown in the drawing) side.

In FIG. 4B, one prism sheet 116 is used. The prism sheet 116 mainly controls the advancing direction of light in the longitudinal direction of the light guide plate 120. Accordingly, it is effective to form the teardrop-shaped lenses 128 on the upper surface 121 of the light guide plate 120 so as to control the direction of radiation light in the lateral direction of the light guide plate 120.

Figure 5:
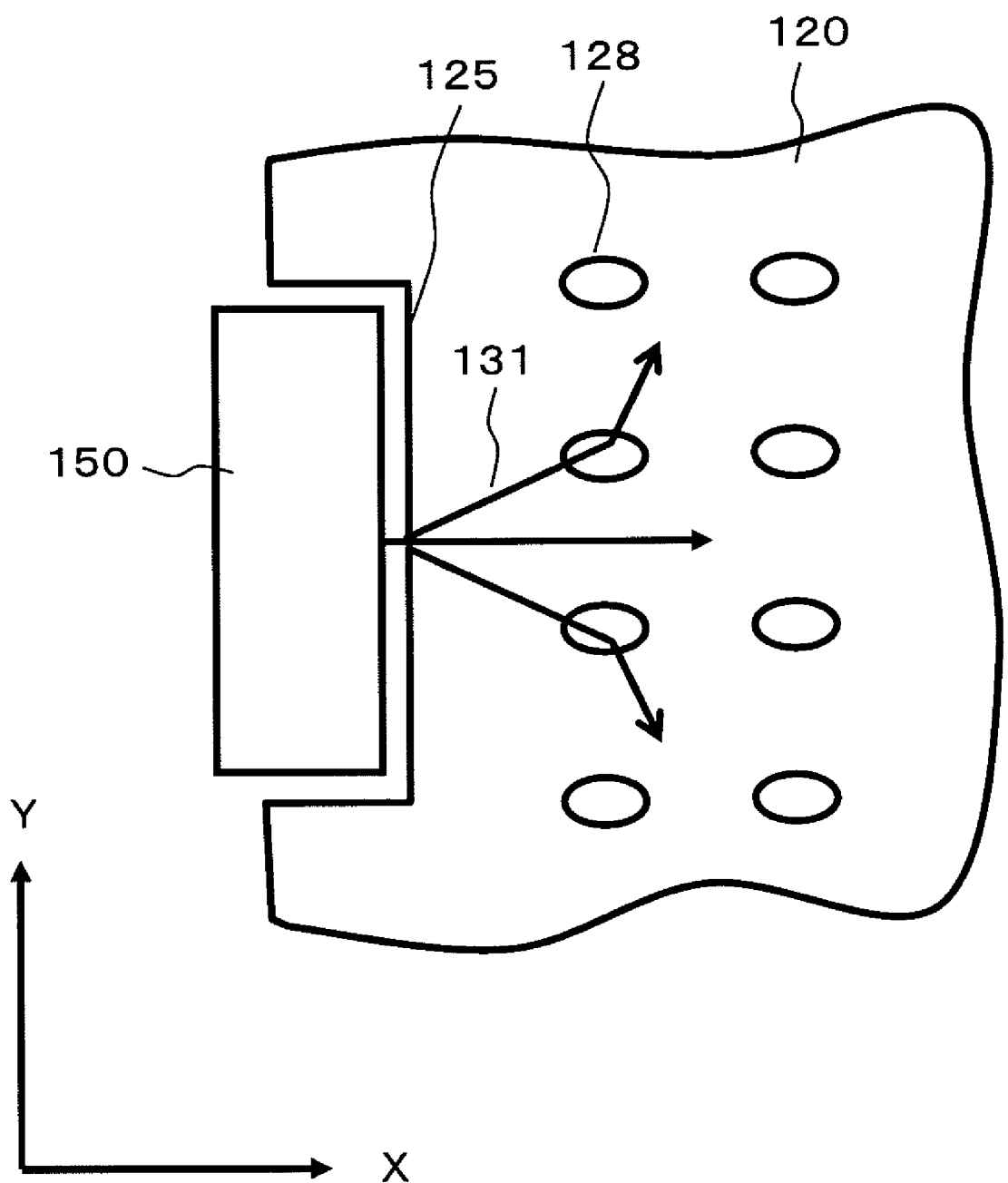
FIG. 5 is a schematic plan view showing a portion of the light guide plate of the liquid crystal display device of the embodiment according to the present invention.

Next, FIG. 5 shows a portion of the upper surface 121 of the light guide plate 120 as viewed in plane from above, wherein the teardrop-shaped lenses 128 are formed on the upper surface 121. A light source (LED 150) is arranged on a left side in the drawing. Although light beams 131 are incident on the light guide plate 120 from the light incident surface 125 and advance in the X direction (longitudinal direction), the light beams 131 also expand in the Y direction (lateral direction). However, most of light beams 131 advances in the longitudinal direction, and light beams 131 which expand in the lateral direction are small in number.

Figure 6A:
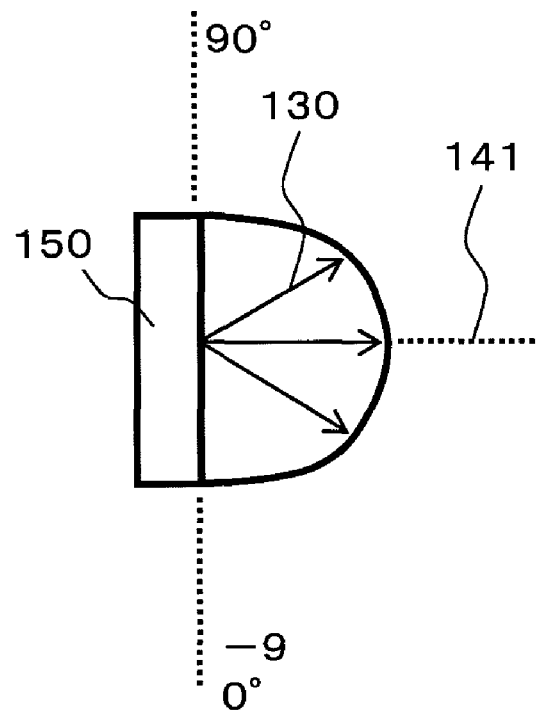
FIG. 6A and FIG. 6B are schematic views showing the advancing direction of light in the vicinity of a light source of the liquid crystal display device of the embodiment according to the present invention.

The advancing directions of lights in the vicinity of the LED 150 are explained in conjunction with FIG. 6. The advancing directions of light 130 emitted from the LED 150 are ideally considered to be uniformly distributed within a range of angle from −90 degrees to 90 degrees with respect to the normal direction 141 as shown in FIG. 6A.

Figure 6B:
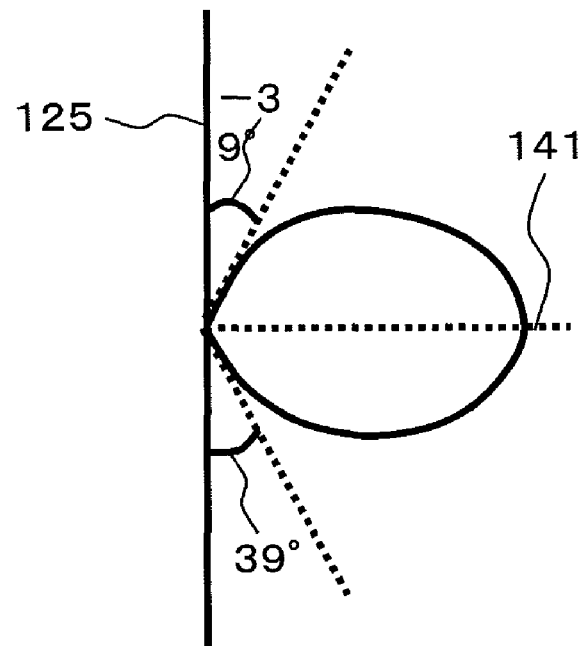

However, as shown in FIG. 6B, the advancing directions of the lights incident on the light guide plate 120 are deviated. Assume a refractive index of the light guide plate 120 as 1.59, for example, the light incident on the incident surface 125 at an angle of 90 degrees with respect to the normal direction 141 of the incident surface 125 becomes the light which advances at an angle of 51.0 degrees with respect to the normal direction 141 in the inside of the light guide plate 120 based on the Snell's law. That is, at a point of time that the lights are incident on the light guide plate 120, there is no light having an angle of 39 degrees or less with respect to the normal direction 141 of the light incident surface 125. Here, for facilitating the understanding of the drawing, an angle of 39.0 degrees with respect to the light incident surface 125 is indicated by dotted lines in the drawing.

Accordingly, as shown in FIG. 6B, the advancing directions of lights in the inside of the light guide plate 120 are distributed in a teardrop shape. That is, the advancing directions of lights are distributed such that a quantity of light in the direction parallel to the light incident surface 125 (in the lateral direction of the light guide plate 120) is small, and the quantity of light in the normal direction 141 (in the longitudinal direction of the light guide plate 120) is large. Accordingly, light which is reflected on the reflection surface 127 formed on the lower surface 122 of the light guide plate 120 shown in FIG. 4 and is radiated from the light guide plate 120 is also influenced by the distribution of the advancing directions of lights shown in FIG. 6B as viewed in a plan view from a light radiation surface side.

In FIG. 4A, by arranging the prism sheets 112, 113 such that the prism sheet 112 and the prism sheet 113 intersect with each other, the light is converged on the liquid-crystal-panel side in both of lateral direction and longitudinal direction of the light guide plate. However, such arrangement of the prism sheets 112, 113 is not sufficient to eliminate the deviation of the distribution of the advancing directions of lights shown in FIG. 6B.

In the liquid crystal display device of the present invention, as shown in FIG. 5, by forming the teardrop lenses 128 on the light guide plate 120 so as to cancel the deviation of the advancing directions of lights in the inside of the light guide plate 120, it is possible to eliminate irregularities of light radiated from the light guide plate 120.

Figure 7A:
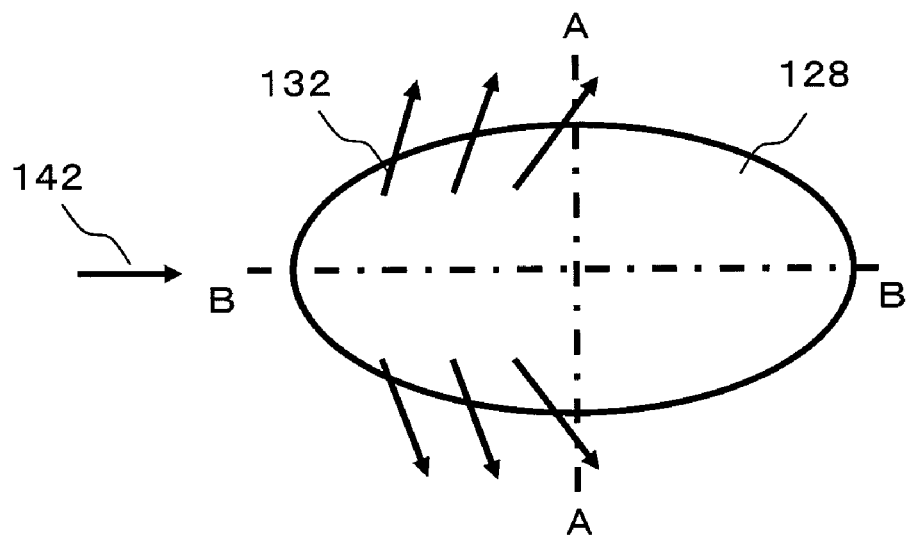
FIG. 7A to FIG. 7C are schematic views showing a shape of a teardrop-shaped lens and the advancing direction of light of the liquid crystal display device of the embodiment according to the present invention.
Figure 7B:
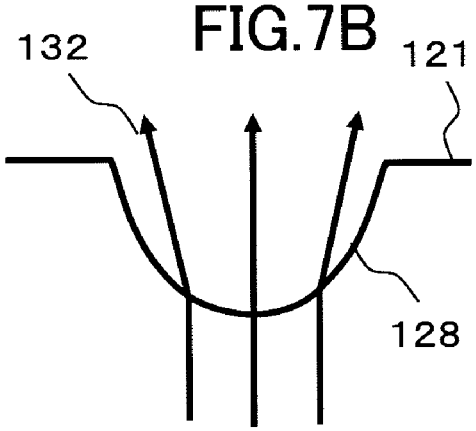
Figure 7C:
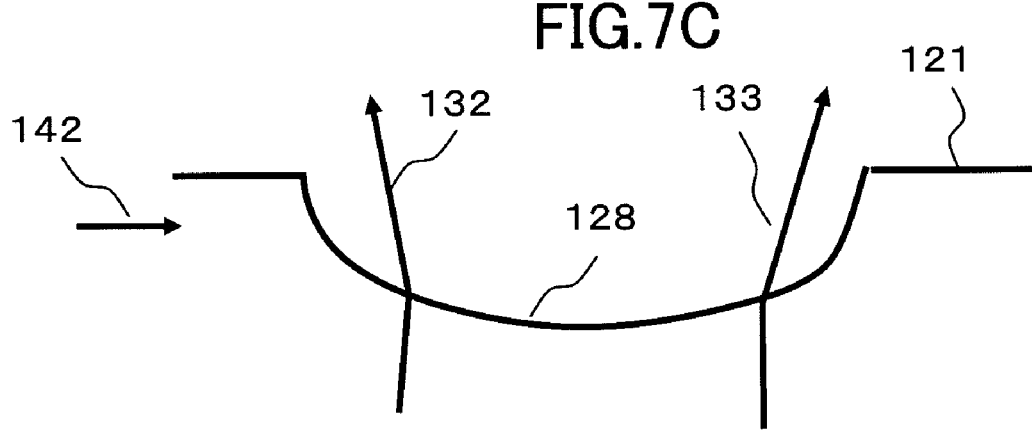

Next, a shape of the teardrop-shaped lens 128 is explained in conjunction with FIG. 7A to FIG. 7C and FIG. 8A to FIG. 8C. FIG. 7B is a cross-sectional view taken along a line A-A in FIG. 7A, and FIG. 7C is a cross-sectional view taken along a line B-B in FIG. 7A.

An arrow 142 in the drawing indicates the main advancing direction of the light. As explained in conjunction with FIG. 6A and FIG. 6B, the light incident on the light guide plate 120 from the light incident surface 125 of the light guide plate 120 mainly advances in the normal direction of the light incident surface 125 (in the longitudinal direction of the light guide plate 120). Hereinafter, the main advancing direction 142 of the light in the inside of the light guide plate 120 may be simply referred to as the advancing direction 142.

The teardrop-shaped lens 128 shown in FIG. 7A to FIG. 7C is a concave teardrop-shaped lens 128 which is recessed toward the inside of the light guide plate 120. Light 132 radiated from the teardrop-shaped lens 128 is refracted in the direction which intersects with the advancing direction 142 of light (in the lateral direction of the light guide plate 120). Accordingly, it is possible to eliminate the deviation of the distribution of the advancing directions of lights.

As shown in FIG. 7B, a cross section of the teardrop-shaped lens 128 taken along a line A-A in FIG. 7A has a substantially semicircular shape. On the other hand, as shown in FIG. 7C, a cross section of the teardrop-shaped lens 128 taken along a line B-B in FIG. 7A has a shape formed by halving an oval shape.

Along with a change of a width of the teardrop-shaped lens 128 in the direction of the line A-A along the line B-B, a radius of the semicircular shape of the teardrop-shaped lens 128 is changed along the line B-B. At the same time, as shown in FIG. 7C, a depth of the teardrop-shaped lens 128 is also changed along the line B-B.

In this manner, the teardrop-shaped lens 128 gradually changes a radius thereof along the advancing direction 142 of light and hence, a curvature of the teardrop-shaped lens 128 is also gradually changed along the advancing direction 142. Accordingly, an angle at which the light is refracted in the direction which intersects with the advancing direction 142 of light in the teardrop-shaped lens 128 is also changed corresponding to the curvature. In this manner, the teardrop-shaped lens 128 having excellent light diffusibility possesses a shape which allows the lights to refract in various angles.

FIG. 7C shows light 133 which advances toward the outside. In the teardrop-shaped lens 128, as shown in FIG. 7B, by refracting light in the direction which intersects with the advancing direction 142, the deviation of the advancing directions of the lights is decreased. Accordingly, it is desirable that the light is not changed in the direction along the advancing direction 142 as much as possible. Particularly, it is desirable to prevent the refraction direction from extending in the direction away from the liquid crystal panel (in the direction toward the outside of the liquid crystal panel).

However, the teardrop-shaped lens 128 shown in FIG. 7A to FIG. 7C is formed of a concave lens and hence, light is refracted toward the outside (toward the left side in the drawing) in an advancing-direction-142-side half portion of the teardrop-shaped lens 128 with respect to the center of the lens so as to generate the light 133 which advances toward the outside. Depending on the structure of the light guide plate 120, it is also necessary to suppress the generation of the light 133 which advances toward the outside.

Figure 8A:
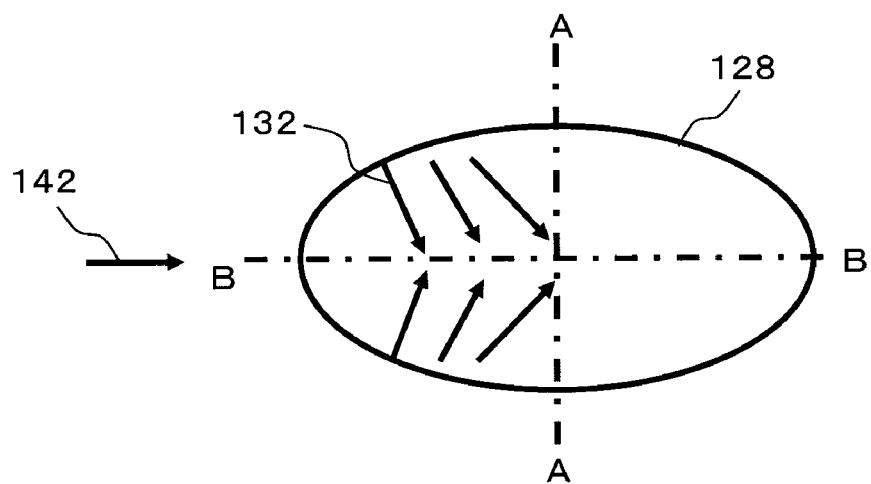
FIG. 8A to FIG. 8C are schematic views showing a shape of a teardrop-shaped lens and the advancing direction of light of the liquid crystal display device of the embodiment according to the present invention.
Figure 8B:
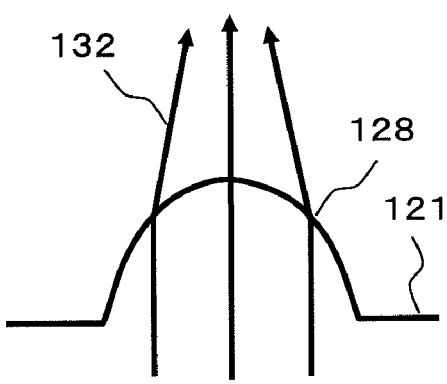
Figure 8C:
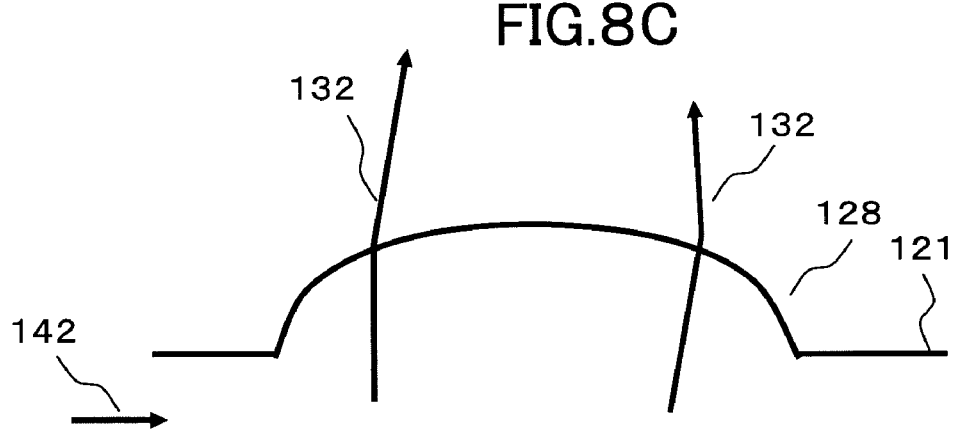

FIG. 8A to FIG. 8C show a convex teardrop-shaped lens 128 which projects toward the outside of the light guide plate 120. The light 132 which is radiated from the teardrop-shaped lens 128 is refracted inwardly with respect to the lens and in the direction which intersects with the advancing direction 142. Accordingly, it is possible to eliminate the c of the distribution of the advancing directions of lights.

FIG. 8B is a cross-sectional view of the teardrop-shaped lens 128 taken along a line A-A in FIG. 8A, and shows a state in which the teardrop-shaped lens 128 plays a role of a convex lens thus refracting the radiation light 132 in an inwardly converging manner.

Figure 9:
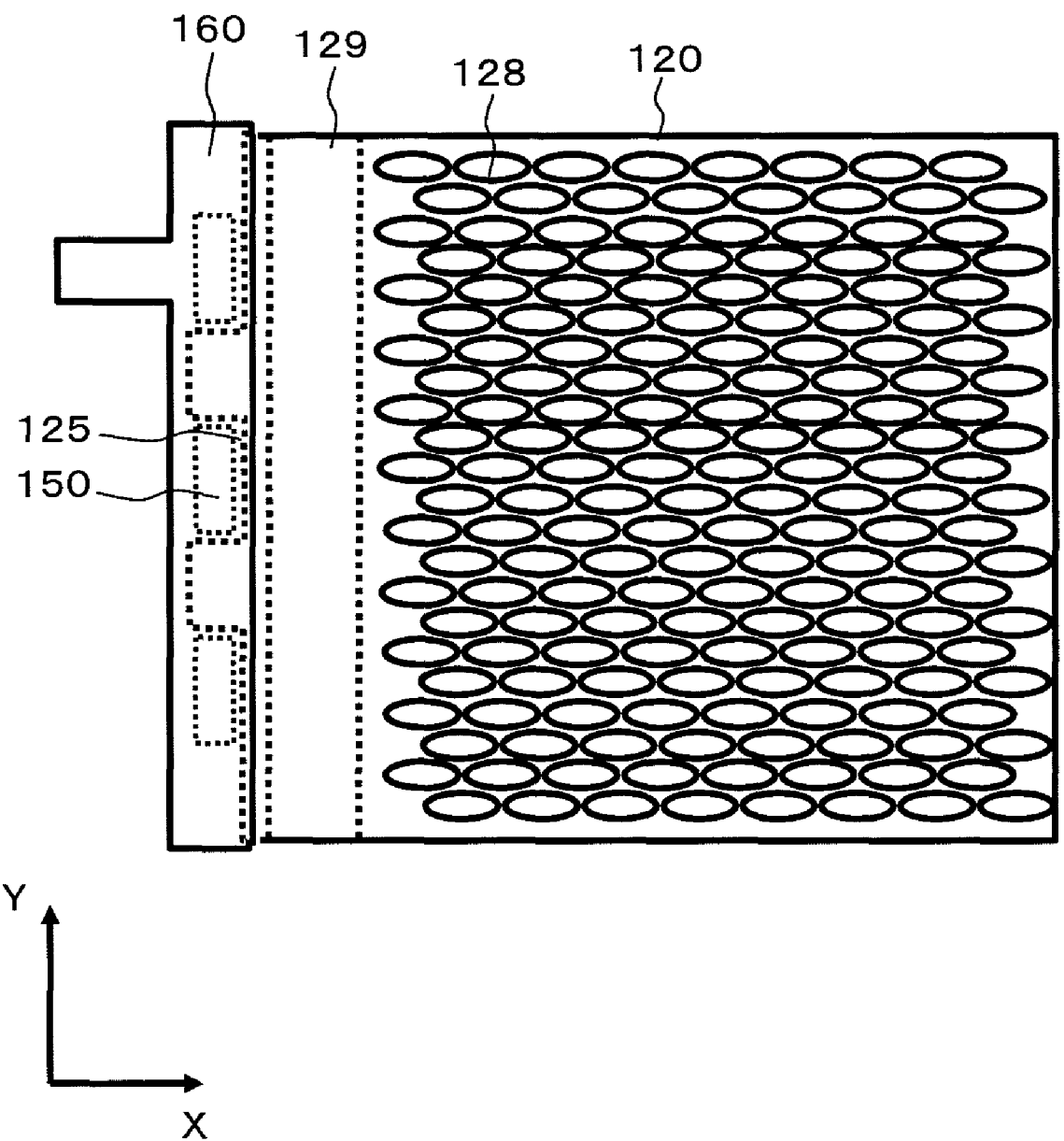
FIG. 9 is a schematic plan view showing the light guide plate of the liquid crystal display device of the embodiment according to the present invention.

Next, shapes and arrangements of the teardrop-shaped lens 128 are explained in conjunction with FIG. 9 to FIG. 19. In FIG. 9, the teardrop-shaped lenses 128 are arranged in a state that the respective teardrop-shaped lenses 128 are displaced alternately in the X direction. That is, the teardrop-shaped lenses 128 are arranged such that lines which connect the centers of the teardrop-shaped lenses 128 form a triangle. In the triangular arrangement shown in FIG. 9, the respective teardrop-shaped lenses 128 can be densely arranged thus enabling the uniform arrangement of the teardrop-shaped lenses 128.

Figure 10:
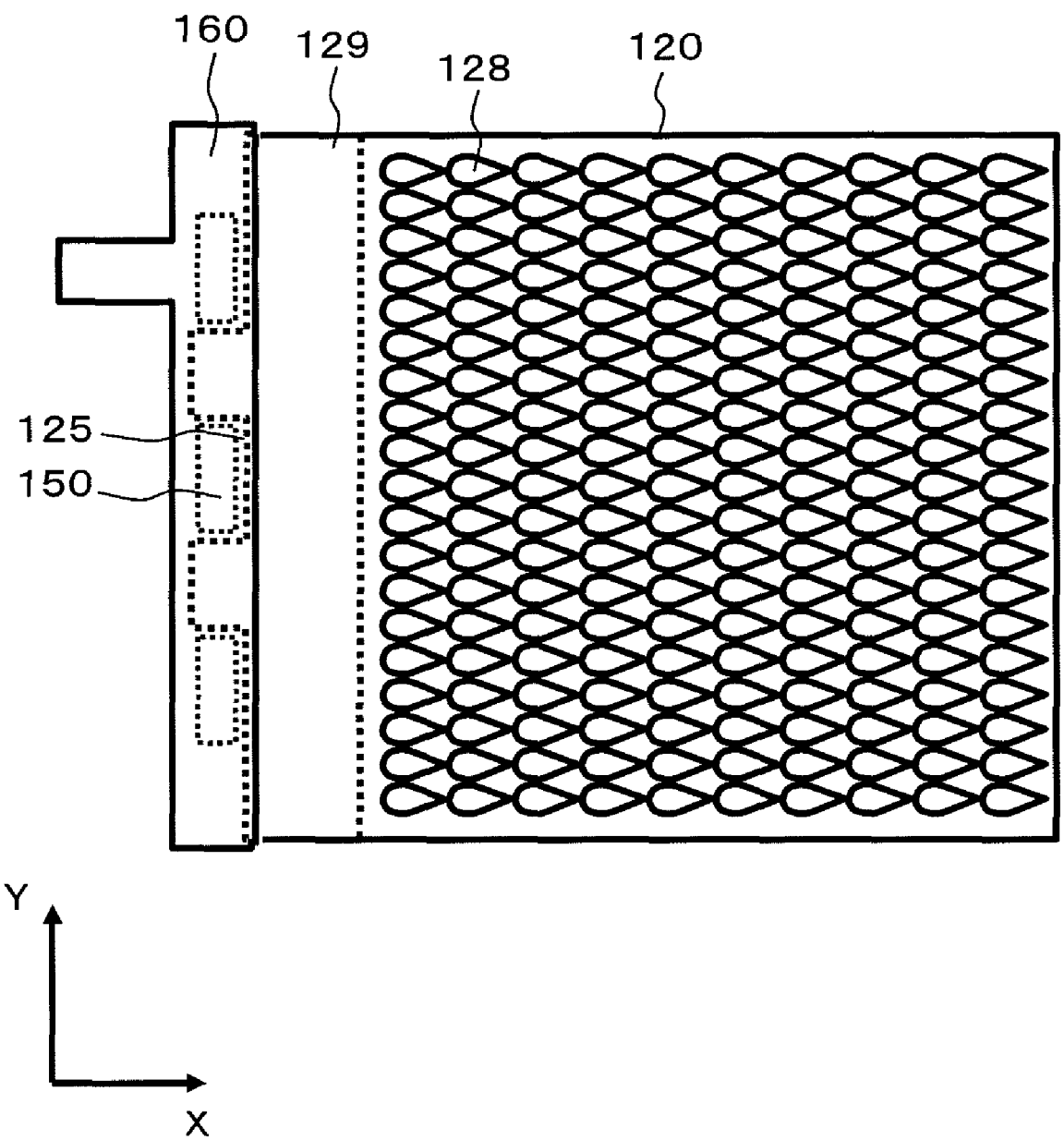
FIG. 10 is a schematic plan view showing the light guide plate of the liquid crystal display device of the embodiment according to the present invention.

In FIG. 10, a shape of the teardrop-shaped lens 128 is formed in an asymmetrical shape such that a side of the teardrop-shaped lens 128 extending away from the light source 150 is gradually tapered. By gradually decreasing a curvature on a side extending away from the light source 150, it is possible to reduce a drawback that the radiation light is refracted in the X direction and advances in the direction away from the liquid crystal panel.

Figure 11A:
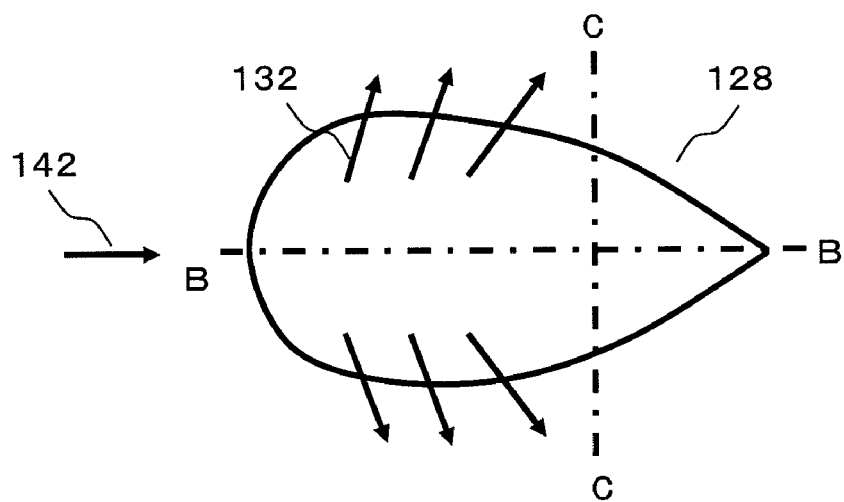
FIG. 11A to FIG. 11C are schematic views showing a shape of a teardrop-shaped lens of the liquid crystal display device of the embodiment according to the present invention.
Figure 11B:
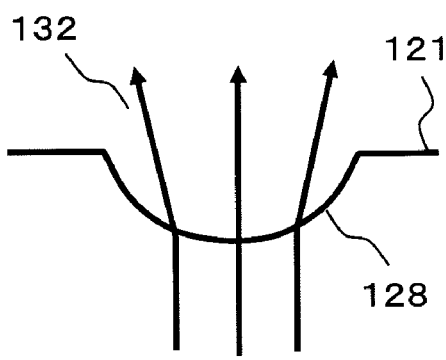
Figure 11C:
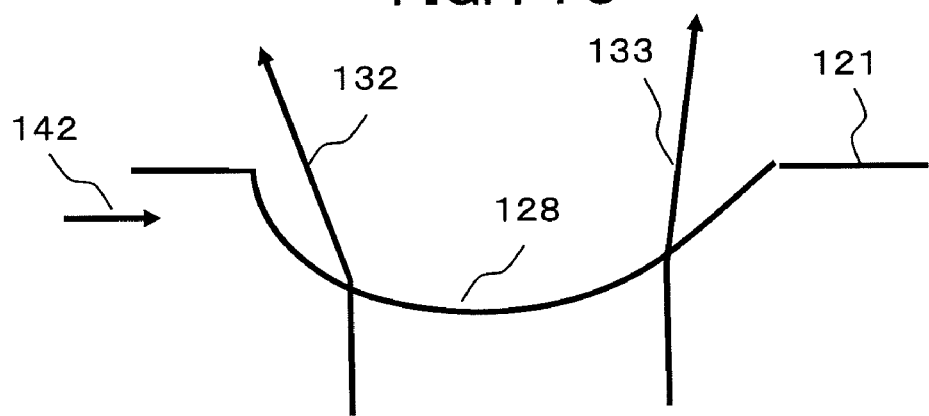

Next, the shape of the asymmetrical teardrop-shaped lens 128 is explained in conjunction with FIG. 11A to FIG. 11C. FIG. 11B is a cross-sectional view taken along a line C-C in FIG. 11A. FIG. 11C is a cross-sectional view taken along a line B-B in FIG. 11A. As shown in FIG. 11C, in the cross section of the teardrop-shaped lens 128 taken along the line B-B, a height of an arc of a latter half portion of the teardrop-shaped lens 128 along the advancing direction 142 of light is set small.

Further, as shown in FIG. 11B, a cross section taken along the line C-C is formed in a flat shape with a small height of an arc relative to a width of the cross section in the direction of the line C-C. Further, compared to the front half portion of the teardrop-shaped lens 128, the curvature of the latter half portion of the teardrop-shaped lens 128 is gradually changed. Accordingly, a refraction angle of the light 133 which advances toward the outside can be restricted to a small value with respect to the direction perpendicular to the upper surface 121.

Figure 12:
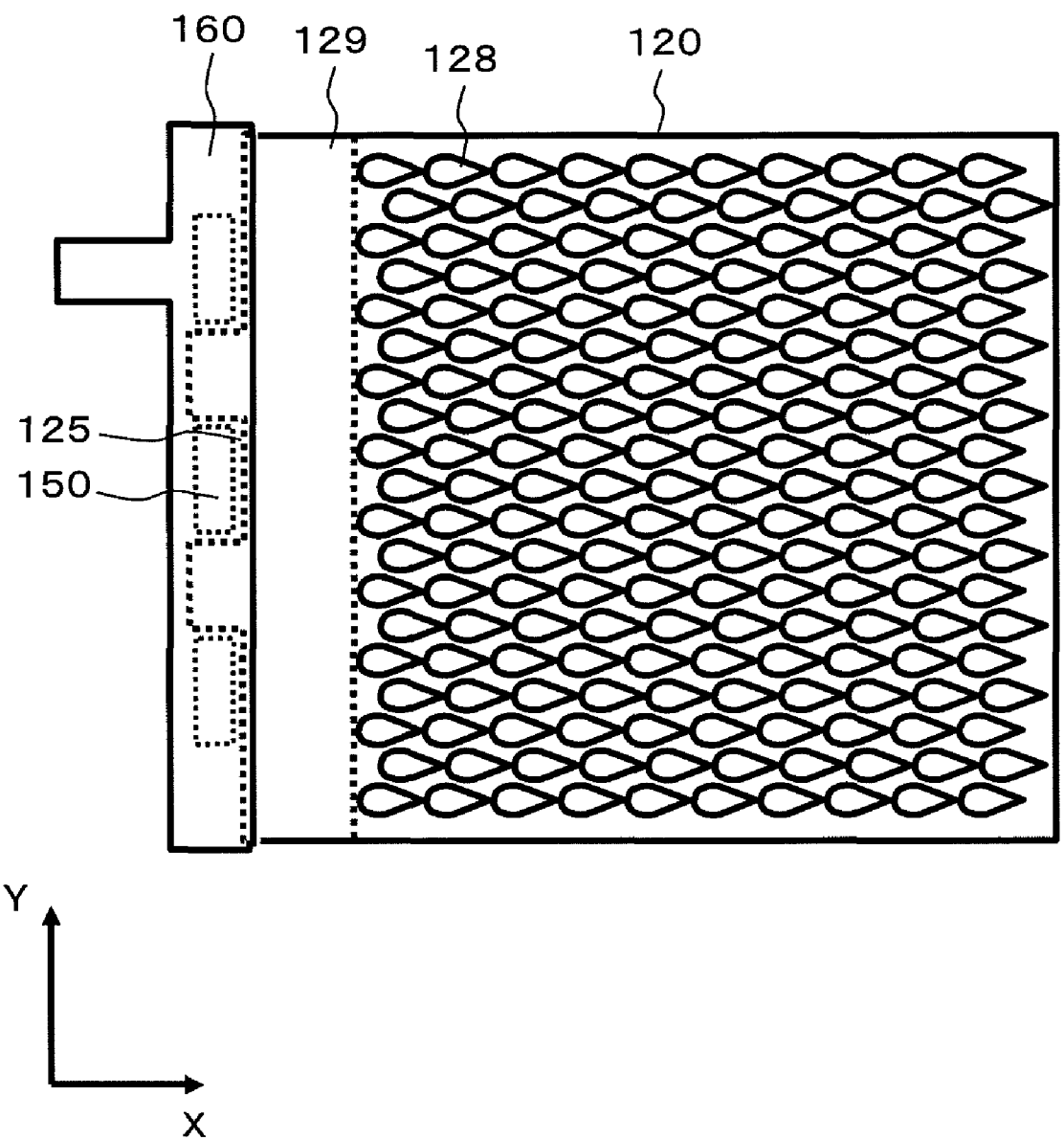
FIG. 12 is a schematic plan view showing the light guide plate of the liquid crystal display device of the embodiment according to the present invention.

Next, FIG. 12 shows a light guide plate 120 on which the teardrop-shaped lens 128 is formed in an asymmetrical shape, and the teardrop-shaped lenses 128 are arranged in the triangular arrangement in which the centers of the teardrop-shaped lenses 128 are displaced alternately. Due to such a triangular arrangement, teardrop-shaped lenses can be uniformly arranged thus reducing a drawback that the refraction light advances toward the direction away from the liquid crystal panel.

Figure 13:
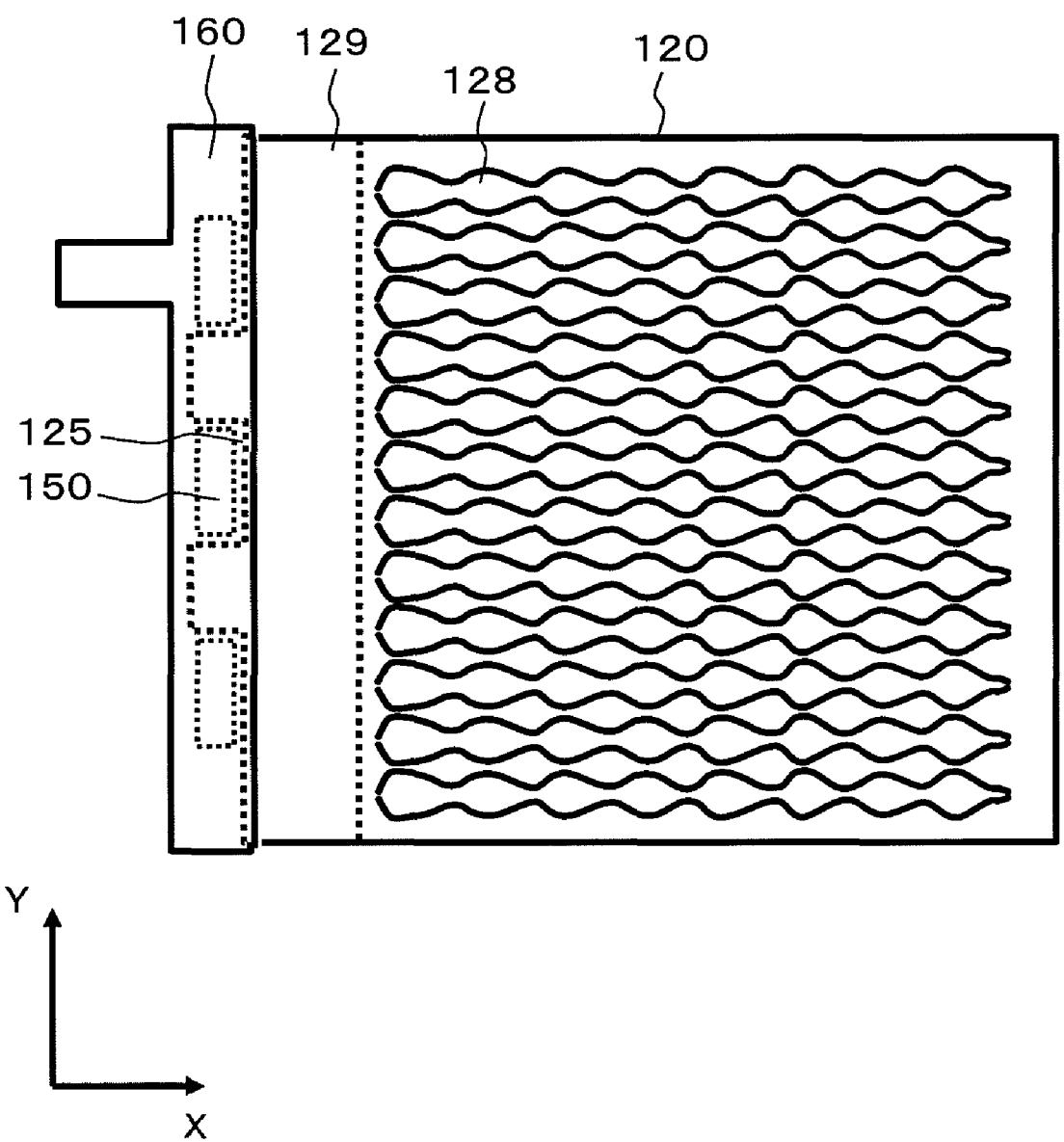
FIG. 13 is a schematic plan view showing the light guide plate of the liquid crystal display device of the embodiment according to the present invention.

FIG. 13 shows a light guide plate 120 on which the teardrop-shaped lenses 128 which are arranged adjacent to each other in the X direction are continuously formed. Since there is no border between the neighboring teardrop-shaped lenses 128, the teardrop-shaped lenses 128 do not have a teardrop shape in a true meaning of the word. However, these teardrop-shaped lenses 128 have a function of correcting the deviation of the distribution of the advancing directions of lights in the inside of the light guide plate 120 and hence, these lenses are referred to as the teardrop-shaped lens 128.

The teardrop-shaped lenses 128 shown in FIG. 13 have no border between the neighboring teardrop-shaped lenses 128 and hence, a drawback that arises in a boundary portion can be reduced. Particularly, the teardrop-shaped lenses 128 shown in FIG. 13 can reduce a drawback that the radiation light is refracted in the X direction and advances in the direction away from the liquid crystal panel.

Figure 14:
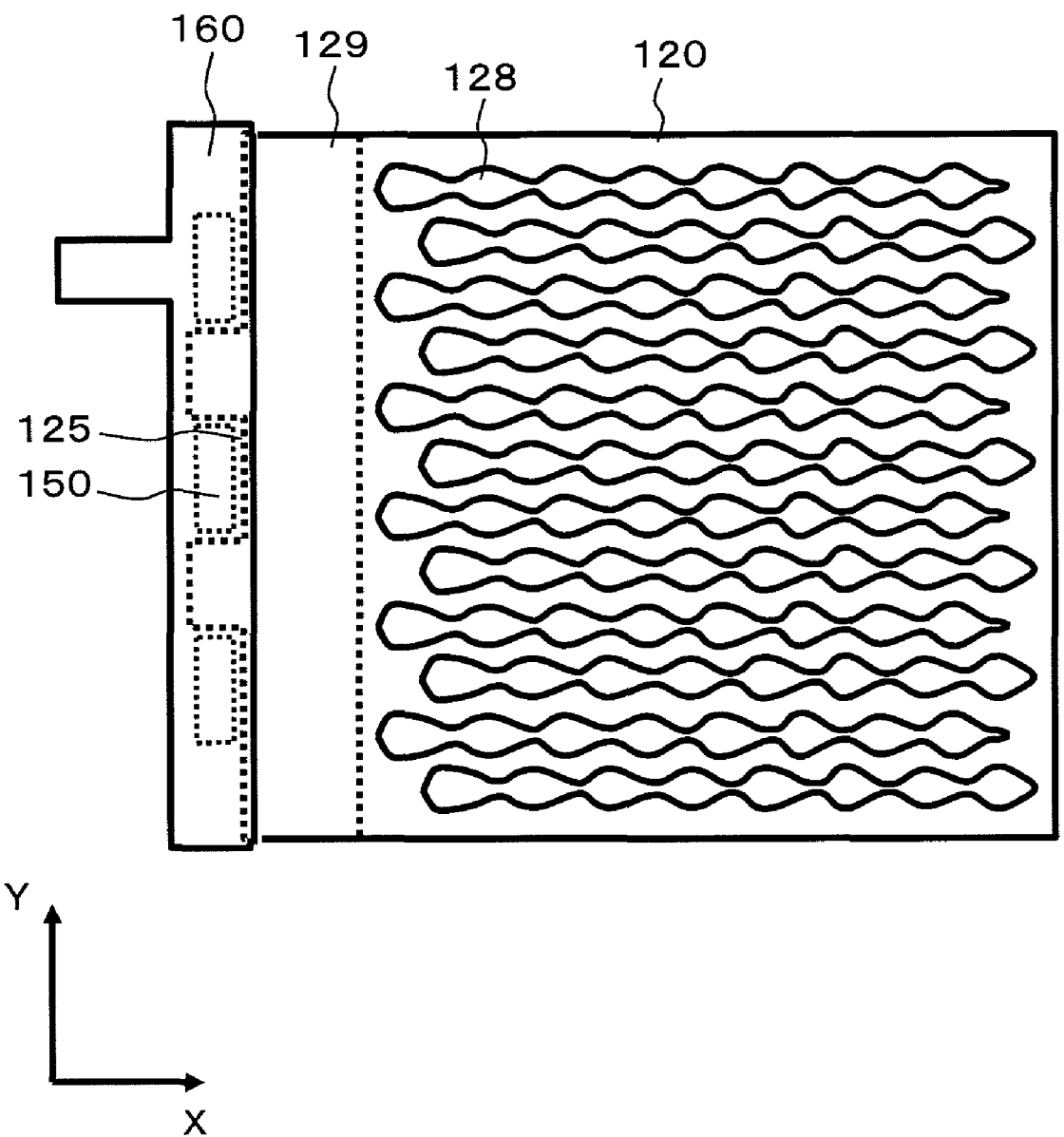
FIG. 14 is a schematic plan view showing the light guide plate of the liquid crystal display device of the embodiment according to the present invention.

FIG. 14 shows the arrangement of teardrop-shaped lenses 128 in which the teardrop-shaped lenses 128 which are arranged adjacent to each other in the X direction are continuously formed, and most projecting portions or most recessed portions of the teardrop-shaped lenses 128 arranged adjacent to each other in the Y direction are displaced from each other in the X direction. In the same manner as the teardrop-shaped lenses 128 arranged in a triangular shape, these teardrop-shaped lenses 128 can be arranged densely and uniformly.

Figure 15:
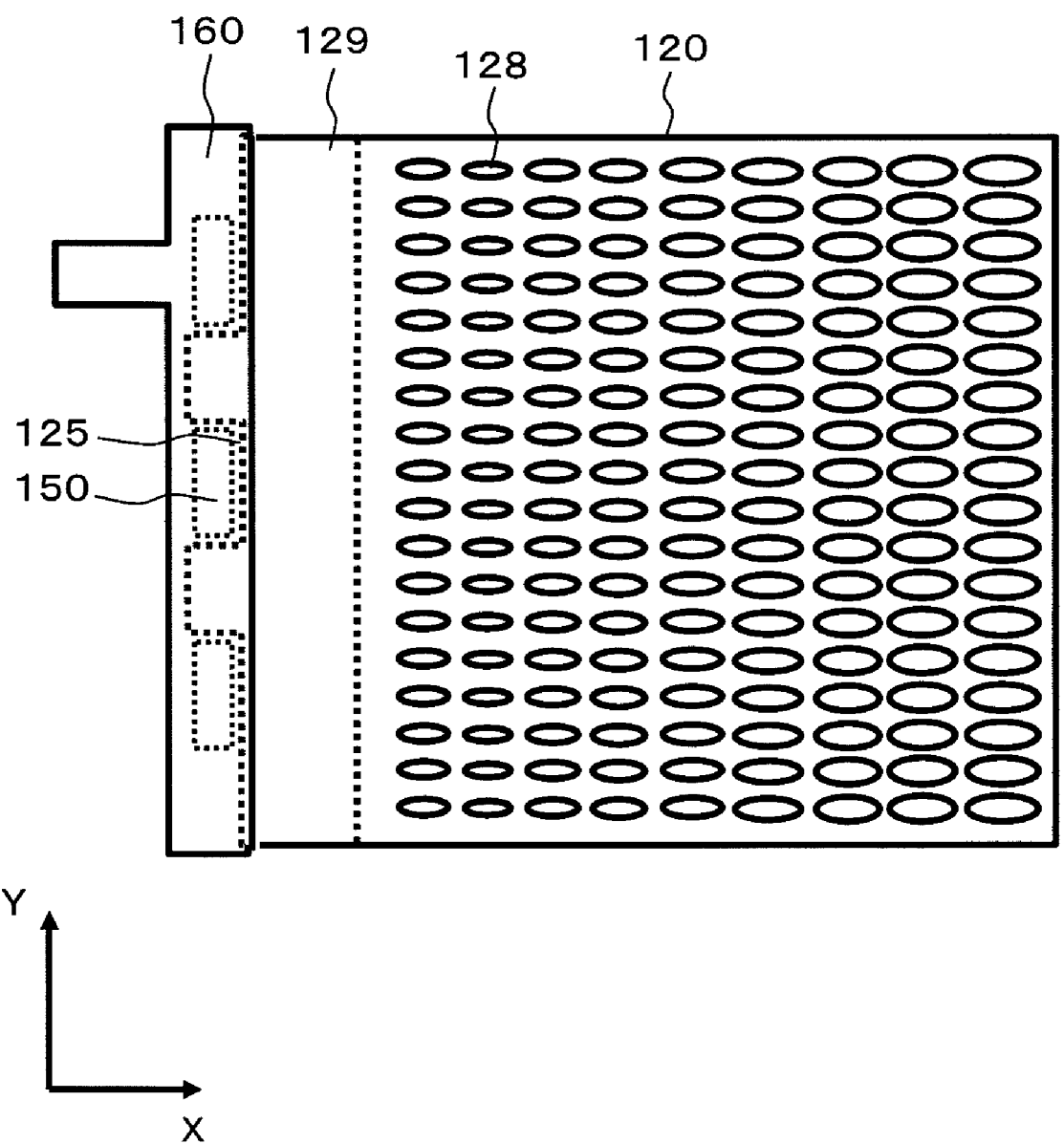
FIG. 15 is a schematic plan view showing the light guide plate of the liquid crystal display device of the embodiment according to the present invention.

FIG. 15 shows the arrangement of teardrop-shaped lenses 128 which have sizes thereof changed in the X direction. When a quantity of light in the inside of the light guide plate 120 is changed corresponding to the increase of the distance from the light source 150, it is possible to make a quantity of radiation light uniform by adjusting sizes of the teardrop-shaped lenses 128.

Figure 16:
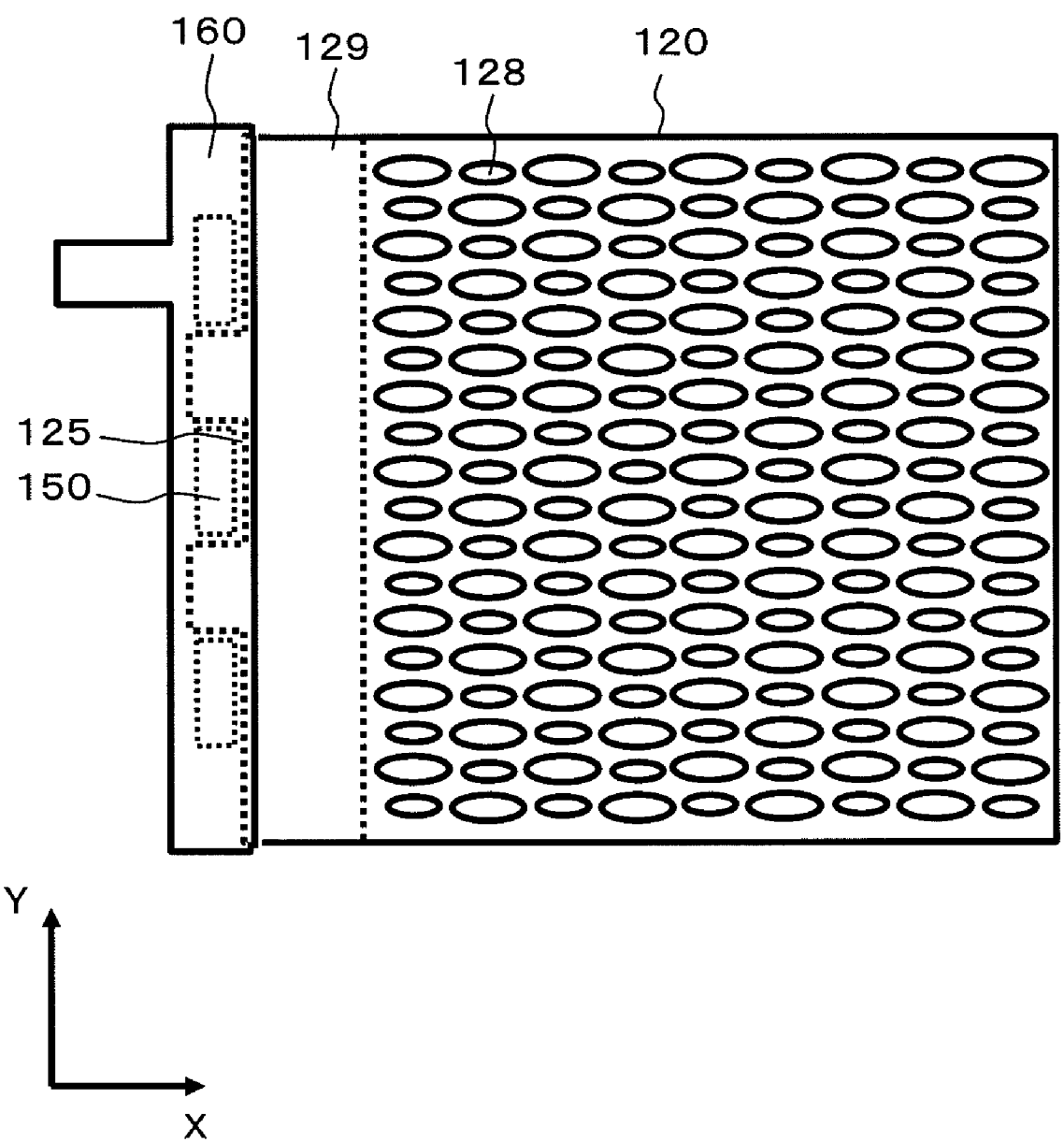
FIG. 16 is a schematic plan view showing the light guide plate of the liquid crystal display device of the embodiment according to the present invention.

FIG. 16 shows the arrangement of teardrop-shaped lenses 128 in which sizes of the teardrop-shaped lenses 128 are changed alternately. By filling the small teardrop-shaped lens 128 between the large teardrop-shaped lenses 128, it is possible to densely arrange the teardrop-shaped lenses 128.

Figure 17:
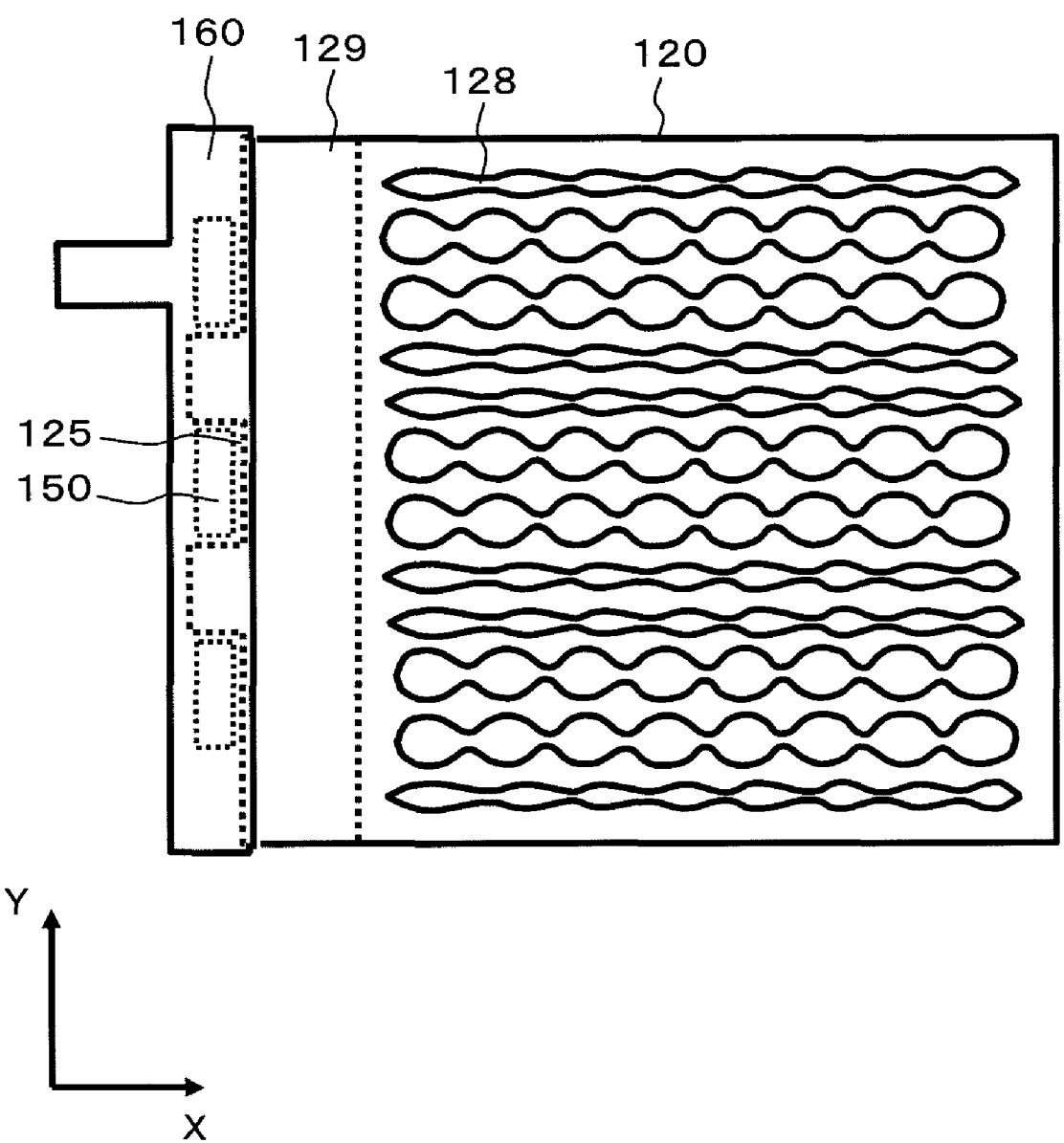
FIG. 17 is a schematic plan view showing the light guide plate of the liquid crystal display device of the embodiment according to the present invention.

FIG. 17 shows the arrangement of teardrop-shaped lenses 128 in which the teardrop-shaped lenses 128 arranged adjacent to each other in the X direction are continuously formed, and widths of the teardrop-shaped lens 128 are changed in the Y direction. The width of the teardrop-shaped lens 128 at a position close to the light source 150 is increased, while the width of the teardrop-shaped lens 128 at a position remote from the light source 150 is decreased. In FIG. 17, the teardrop-shaped lenses 128 are configured to refract the light advancing linearly in the X direction from the light source 150 in the Y direction as much as possible. Here, a depth or a height of the teardrop-shaped lens 128 is also changed in conformity with a width of the teardrop-shaped lens 128.

Figure 18:
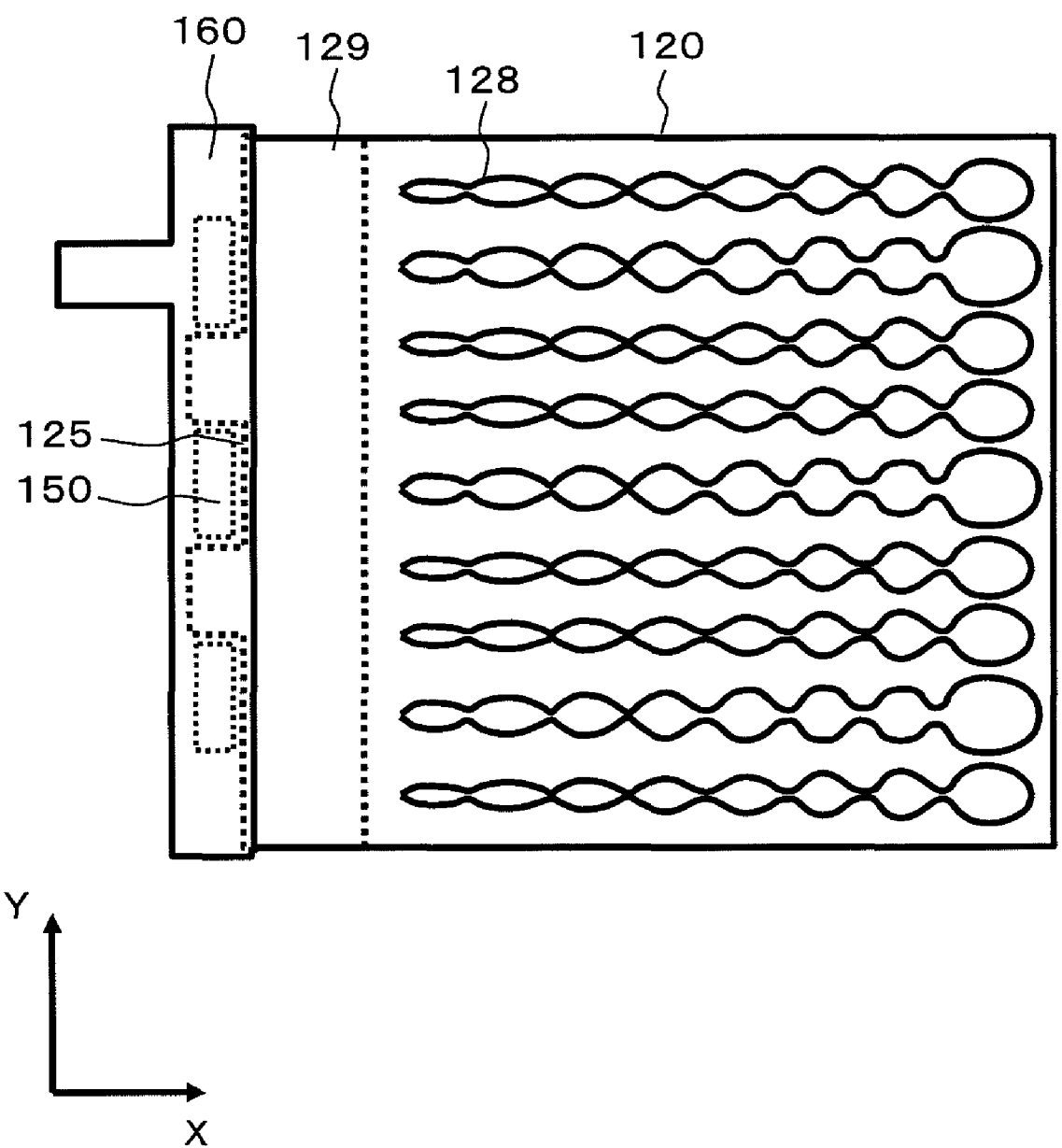
FIG. 18 is a schematic plan view showing the light guide plate of the liquid crystal display device of the embodiment according to the present invention.

FIG. 18 shows the arrangement of teardrop-shaped lenses 128 in which the teardrop-shaped lenses 128 are continuously formed, and the width of the teardrop-shaped lens 128 is increased corresponding to the increase of the distance from the light source 150 in the X direction. This arrangement is effectively applicable when the quantity of light in the inside of the light guide plate 120 is decreased corresponding to the increase of the distance from the light source 150. A depth or a height of the teardrop-shaped lens 128 shown in FIG. 18 can be also changed in conformity with a width of the teardrop-shaped lens 128.

Figure 19:
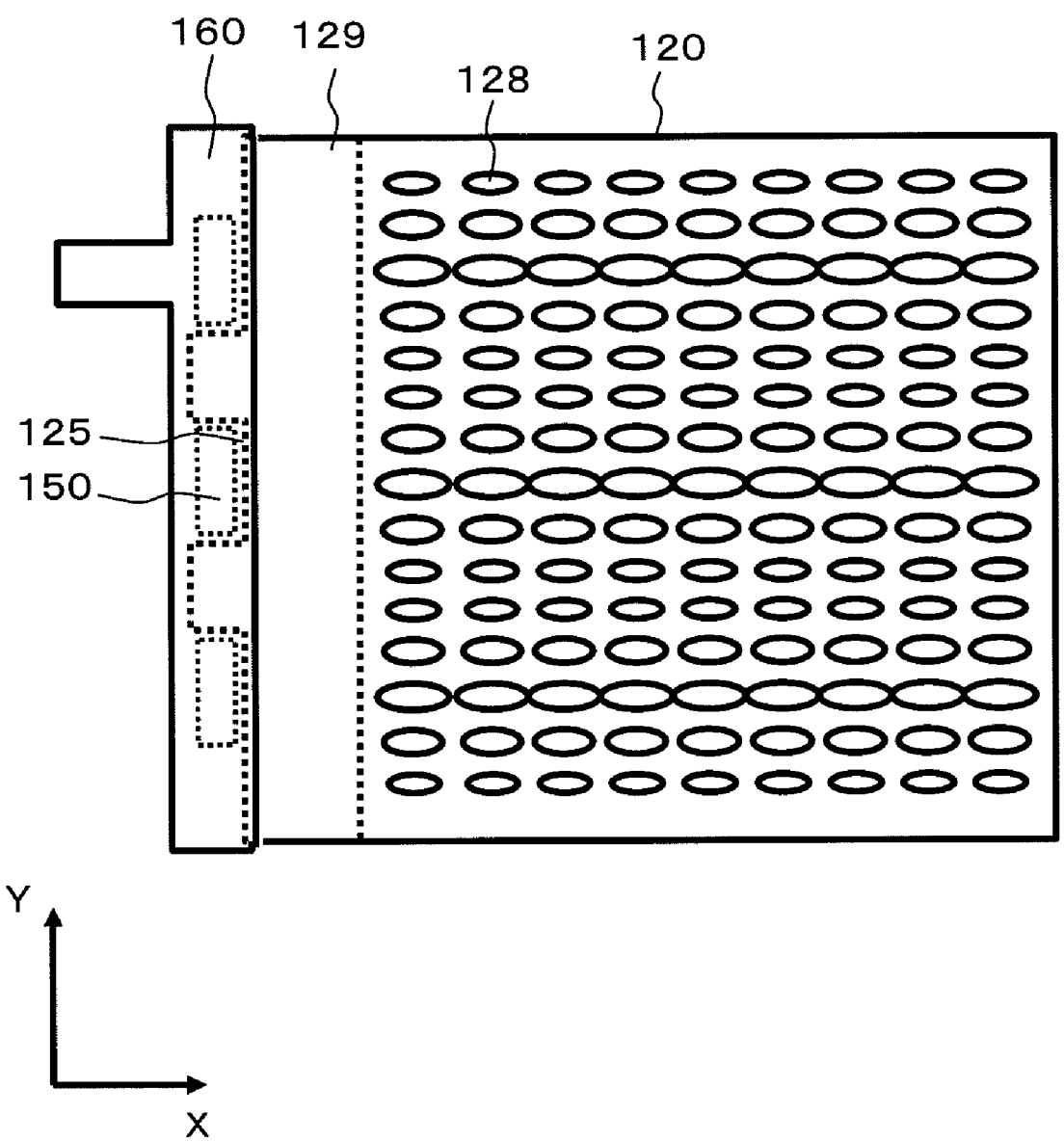
FIG. 19 is a schematic plan view showing the light guide plate of the liquid crystal display device of the embodiment according to the present invention.

FIG. 19 shows the arrangement of teardrop-shaped lenses 128 in which a size of the teardrop-shaped lens 128 is changed in a stepped manner in the Y direction. The size of the teardrop-shaped lens 128 is changed corresponding to a quantity of light which has the advancing direction thereof deviated in the X direction.

Figure 20:
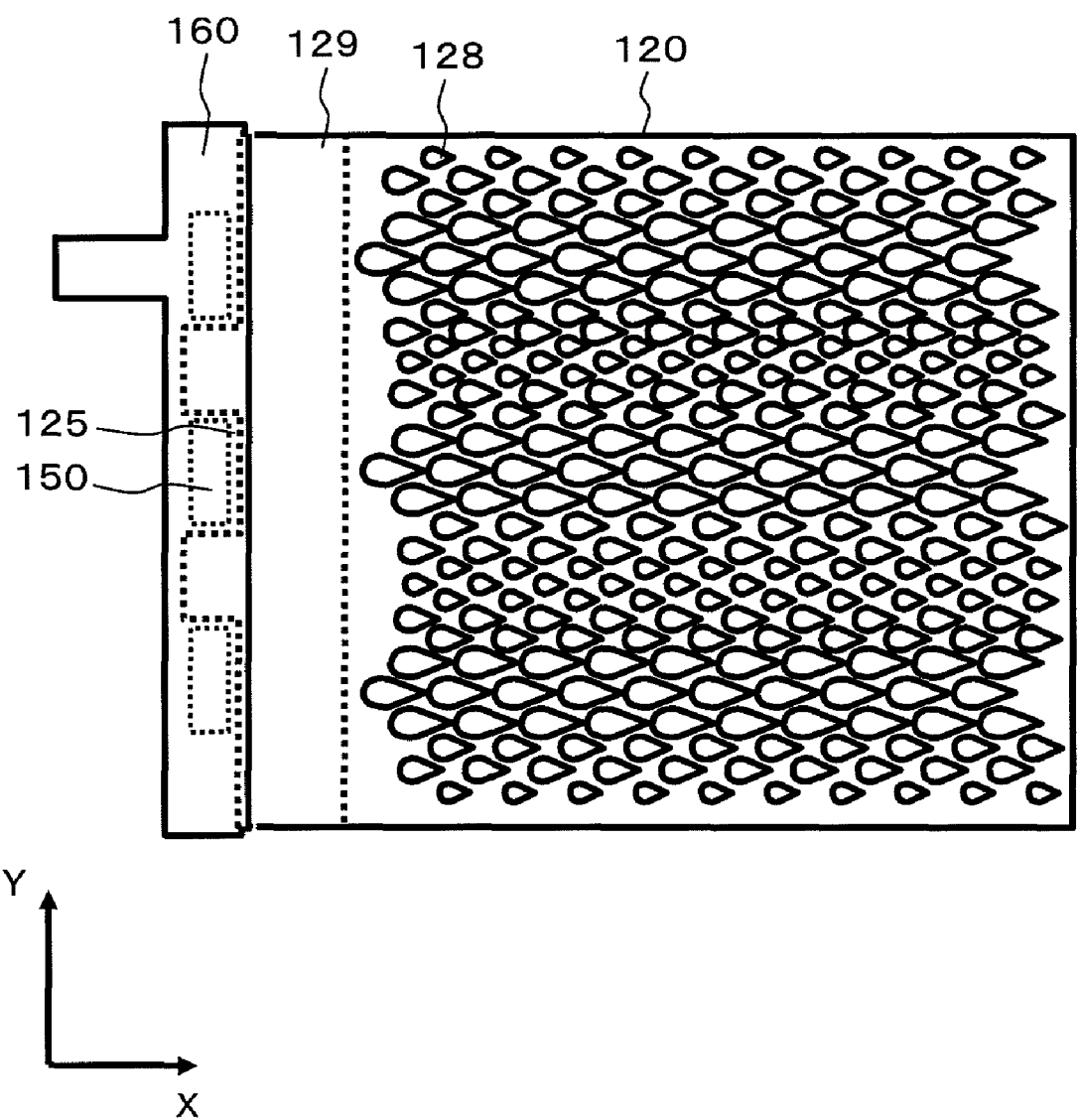
FIG. 20 is a schematic plan view showing the light guide plate of the liquid crystal display device of the embodiment according to the present invention.

FIG. 20 shows the arrangement of teardrop-shaped lenses 128 in which the teardrop-shaped lens 128 has an asymmetrical shape, a size of the teardrop-shaped lens 128 is changed in the Y direction in a stepped manner, and the teardrop-shaped lenses 128 are arranged in a triangular shape. That is, the size of the teardrop-shaped lens 128 is changed corresponding to a quantity of light, and light which advances linearly in the X direction from the light source 150 is refracted in the Y direction as much as possible. Further, by adopting the triangular arrangement in which the teardrop-shaped lens 128 fills a gap defined between the two neighboring teardrop-shaped lenses 128, the teardrop-shaped lenses 128 can be arranged densely. Further, by gradually decreasing a curvature of the teardrop-shaped lens 128 on a side remote from the light source 150, it is possible to reduce a drawback that radiation light is refracted in the X direction, and advances in the direction away from the liquid crystal panel.

What is claimed is:

1. A liquid crystal display device comprising: a liquid crystal panel; a backlight which radiates light to the liquid crystal panel; a light emitting element mounted on the backlight; a light guide plate mounted on the backlight, the light emitting element being mounted along a side surface of the light guide plate; a reflection/scattering member being formed on the light guide plate for directing light which advances from the light emitting element mounted along the side surface of the light guide plate through the light guide plate; and teardrop-shaped lenses formed on a light radiation surface of the light guide plate and being elongated along the advancing direction of the light emitted from the light emitting element mounted along the side surface of the light guide plate; wherein each of the teardrop-shaped lenses is configured to gradually change a radius thereof along the advancing direction of the light which advances through the light guide plate therein.

2. A liquid crystal display device according to claim 1, wherein each of the teardrop-shaped lenses has an elliptical cross section in plan view.

3. A liquid crystal display device according to claim 1, wherein each of the teardrop-shaped lens has an asymmetrical shape.

4. A liquid crystal display device comprising: a liquid crystal panel; a backlight which radiates light to the liquid crystal panel; a light guide plate mounted on the backlight, the backlight having a light emitting element mounted along a side surface of the light guide plate thereof; a reflection/scattering member being formed on the light guide plate for directing the light which advances from the light emitting element mounted along the side surface of the light guide plate through the light guide plate; the light emitting element including a plurality of light emitting diodes arranged along the side surface of the light guide plate; and teardrop-shaped lenses formed on a light radiation surface of the light guide plate, each of the teardrop-shaped lenses being elongated in the direction away from the side surface of the light guide plate; wherein each of the teardrop-shaped lenses is configured to gradually change a radius thereof along the advancing direction of the light which advances through the light guide plate therein.

5. A liquid crystal display device according to claim 4, wherein the radius of each of the teardrop-shaped lenses along the side surface of the light guide plate is changed corresponding to the increase of a distance from the side surface.

6. A liquid crystal display device according to claim 4, wherein each of the teardrop-shaped lenses has an elliptical cross section in plan view.

7. A liquid crystal display device according to claim 4, wherein each of the teardrop-shaped lenses has an asymmetrical shape.

8. A liquid crystal display device comprising; a liquid crystal panel; and a planar lighting device which radiates light to the liquid crystal panel, wherein the planar lighting device includes a light guide plate having a light radiation surface and a bottom surface which faces the light radiation surface in an opposed manner, the light guide plate includes side surfaces which intersect with the light radiation surface or the bottom surface, and a reflection/scattering member directing the light which advances through the light guide plate, a plurality of LEDs is arranged along a first side surface of the light guide plate, the first side surface forms a light incident surface of the light guide plate by allowing light from the LEDs to be incident on the light guide plate from the first side surface, the light incident on the light guide plate is directed toward a light-radiation-surface side by the reflection/scattering member mounted on the bottom surface of the light guide plate, and is radiated from the light radiation surface, and teardrop-shaped lenses are formed on the light radiation surface of the light guide plate for diffusing the radiated light by the teardrop-shaped lenses, the teardrop-shaped lenses being elongated along an advancing direction of the light from the LEDs arranged along the side surface of the light guide plate; wherein each of the teardrop-shaped lenses is configured to gradually change a radius thereof along the advancing direction of the light which advances through the light guide plate therein.

9. A liquid crystal display device according to claim 8, wherein each of the teardrop-shaped lenses has an asymmetrical shape.

* * * * *